(12) United States Patent
Panak et al.

(10) Patent No.: US 6,931,183 B2
(45) Date of Patent: Aug. 16, 2005

(54) HYBRID ELECTRO-OPTIC CABLE FOR FREE SPACE LASER ANTENNAS

(75) Inventors: David L. Panak, Bryan, TX (US); Mark A. Doucet, Bryan, TX (US)

(73) Assignee: Dominion Lasercom, Inc., Bryan, TX (US)

( * ) Notice: Subject to any disclaimer, the term of this patent is extended or adjusted under 35 U.S.C. 154(b) by 87 days.

(21) Appl. No.: 10/060,104

(22) Filed: Jan. 29, 2002

(65) Prior Publication Data

US 2002/0126967 A1 Sep. 12, 2002

Related U.S. Application Data

(63) Continuation-in-part of application No. 09/106,826, filed on Jun. 29, 1998, now Pat. No. 6,348,986, which is a continuation-in-part of application No. 08/625,725, filed on Mar. 29, 1996, now Pat. No. 5,786,923.

(51) Int. Cl.[7] .................................................. G02B 6/44
(52) U.S. Cl. .......................................................... 385/101
(58) Field of Search ................................ 385/100–114

(56) References Cited

U.S. PATENT DOCUMENTS

| | | |
|---|---|---|
| 3,492,484 A | 1/1970 | Michiaki |
| 3,824,597 A | 7/1974 | Berg |
| 4,090,067 A | 5/1978 | Bell, III et al. |
| 4,156,104 A | 5/1979 | Mondello |
| 4,358,858 A | 11/1982 | Tamura et al. |
| 4,533,247 A | 8/1985 | Epworth |
| 4,627,106 A | 12/1986 | Drake |
| 4,662,004 A | 4/1987 | Fredriksen et al. |
| 4,727,600 A | 2/1988 | Avakian |
| 4,796,301 A | 1/1989 | Uzawa et al. |
| 4,823,402 A | 4/1989 | Brooks |
| 4,847,481 A | 7/1989 | Altmann |
| 4,888,816 A | 12/1989 | Sica, Jr. |
| 4,896,939 A | 1/1990 | O'Brien |
| 4,975,926 A | 12/1990 | Knapp |

(Continued)

FOREIGN PATENT DOCUMENTS

| | | |
|---|---|---|
| EP | 0631401 A1 | 6/1994 |
| EP | 0653852 A1 | 11/1994 |
| GB | 2196809 | 5/1988 |
| GB | 2261575 | 5/1993 |
| GB | 2360853 | 10/2001 |
| JP | 1018326 | 1/1989 |
| WO | 98/54732 | 12/1998 |

OTHER PUBLICATIONS

US 5,198,918, 3/1993, Freitas et al. (withdrawn)
Marketing Brochure entitled "Atmospheric Infrared Transmission for Data/Voice", American Laser Systems, Inc., 2 pps.

(Continued)

*Primary Examiner*—J. F. Duverne
(74) *Attorney, Agent, or Firm*—Meyertons Hood Kivlin Kowert & Goetzel P.C.; Jeffrey C. Hood; Mark K. Brightwell

(57) ABSTRACT

A hybrid cable comprising an optical fiber, an intermediate layer surrounding the optical fiber, and an electrically insulating jacket surrounding the intermediate layer. The intermediate layers include a collection of metallic strands. The hybrid cable may be used to establish simultaneous electrical and fiber-optic connection between two communication devices. Thus, the two communication devices may simultaneously transfer optical signals through the optical fiber and perform any of various electrical functions (power transfer, eye safety control) through the metallic strands. For example, an optical transceiver may couple to an optical antenna unit through the hybrid cable. Such an optical transceiver may serve as part of a point-to-point link, a point-to-multipoint link, and/or a link between a primary transceiver unit and an optical router.

28 Claims, 22 Drawing Sheets

U.S. PATENT DOCUMENTS

| | | | |
|---|---|---|---|
| 4,977,618 | A | 12/1990 | Allen |
| 4,982,445 | A | 1/1991 | Grant et al. |
| 4,987,607 | A | 1/1991 | Gilbreath et al. |
| 5,060,304 | A | 10/1991 | Solinsky |
| 5,068,916 | A | 11/1991 | Harrison et al. |
| 5,087,982 | A | 2/1992 | Smothers |
| 5,090,795 | A | 2/1992 | O'Meara et al. |
| 5,099,346 | A | 3/1992 | Lee et al. |
| 5,121,243 | A | 6/1992 | Miyahira et al. |
| 5,191,461 | A | 3/1993 | Cranshaw et al. |
| 5,218,467 | A | 6/1993 | Ross et al. |
| 5,229,593 | A | 7/1993 | Cato |
| 5,247,380 | A | 9/1993 | Lee et al. |
| 5,247,381 | A | 9/1993 | Olmstead et al. |
| 5,282,073 | A | 1/1994 | Defour et al. |
| 5,297,144 | A | 3/1994 | Gilbert et al. |
| 5,321,542 | A | 6/1994 | Freitas et al. |
| 5,321,849 | A | 6/1994 | Lemson |
| 5,343,287 | A | 8/1994 | Wilkins |
| 5,349,137 | A * | 9/1994 | Cedrone ............... 174/76 |
| 5,359,189 | A | 10/1994 | Savicki |
| 5,359,446 | A | 10/1994 | Johnson et al. |
| 5,363,221 | A | 11/1994 | Sutton et al. |
| 5,371,623 | A | 12/1994 | Eastmond et al. |
| 5,390,040 | A | 2/1995 | Mayeux |
| 5,390,273 | A * | 2/1995 | Rahman et al. ............ 385/112 |
| 5,455,672 | A | 10/1995 | Lamonde et al. |
| 5,493,436 | A | 2/1996 | Karasawa et al. |
| 5,545,955 | A | 8/1996 | Wood |
| 5,557,698 | A * | 9/1996 | Gareis et al. ............... 385/101 |
| 5,666,453 | A * | 9/1997 | Dannenmann ............ 385/101 |
| 5,737,690 | A | 4/1998 | Gutman |
| 5,748,813 | A | 5/1998 | Cassidy |
| 6,239,888 | B1 | 5/2001 | Willebrand |
| 6,295,401 | B1 | 9/2001 | Rutterman et al. |

OTHER PUBLICATIONS

"VIPSLAN–10", JVC Marketing Information, 6 pps.

"VIPSLAN–10 Streaks Off the Wire", LAN Magazine, Sep. 1995, 2 pps.

"Omnibeam 4000", The Solutions Group, Advanced Network Solutions, 1995, 2 pps.

United States Statutory Invention Registration for "Covert Beam Projector", Reg. No. H299, Miller, Jr., Jul. 7, 1987.

Lehmann, R., "Brueckenschlag," Nachrichten Elektronik UND Telematik, vol. 50, No. 3, Mar. 1, 1996, pp. 26–27.

International Search Report for PCT/US 97/04935 dated Jul. 18, 1997.

Sladek, "Vier–Strahl–Technik Macht Uebertragung Sicherer," Nachrichten Elektronik und Telematik, vol. 50, No. 8, Aug. 1996, pp. 32–33.

Kube, "Renaissance Eines Alten Konzepts," Nachrichten Elektronik und Telematik, vol. 49, No. 5, May 1995, pp. 15, 16, and 18.

International Search Report, Application No. PCT/US99/14710, mailed Mar. 8, 2000.

AstroTerra Corp, "Additional Services," website: http://www.photon.com/matsueda/Ast . . . /Additional%20Services/addserv.htm, 1996, 2 pages.

AstroTerra Corp, "Product Information, TerraLink 1000™ Series," website: http://www.photon.com/matsueda/Ast . . . a/Product%20Info/T_1000/t_10000.htm, 1996, 2 pages.

AstroTerra Corp, "Product FAQ, Frequently Asked Questions," website: http://www.photon.com/matsueda/AstroTerra/FAQ/faq/htm, 1996, 5 pages.

International Search Report for PCT/US99/15973 dated Jul. 15, 1999.

Electronics Letters, vol. 26, No. 18 dated Aug. 30, 1990.

Bernard J. Klein and John J. Degnan Optical Antenna Gain—1: Transmitting Antennas, Applied Optics, vol. 13, No. 9, Sep. 1974.

John J. Degnan and Bernard J. Klein Optical Antenna Gain—2: Receiving antennas, Applied Optics, vol. 13, No. 10, Oct. 1974.

N. J. Frigo et al. "Demonstrationn of Performance–Tiered Modulators in a WDM PON with a Single Shared Source," Proc. 21st Eur. Conf. On Opt. Comm (ECOC'95—Brussels) pp. 441–444.

Chapter 1 of the book "Telecommunication Principles", by J.J. O'Reilly, which was first published in 1984 and reprinted in 1985 and 1987.

Article "Optical Wireless—A Prognosis" by Smyth et al., SPIE vol. 2601, pp 212–225, which was published in Oct. 1995 and which was available for public inspection in the British Library from Feb. 16, 1996.

European Search Report, Application No. 02004370.9–2411, dated Apr. 24, 2002.

ORDER filed in U.S. District Court, Western District of Washington at Seattle, Case No. C00–1062C, *Terabeam* v. *Dominion* on Sep. 25, 2001.

* cited by examiner

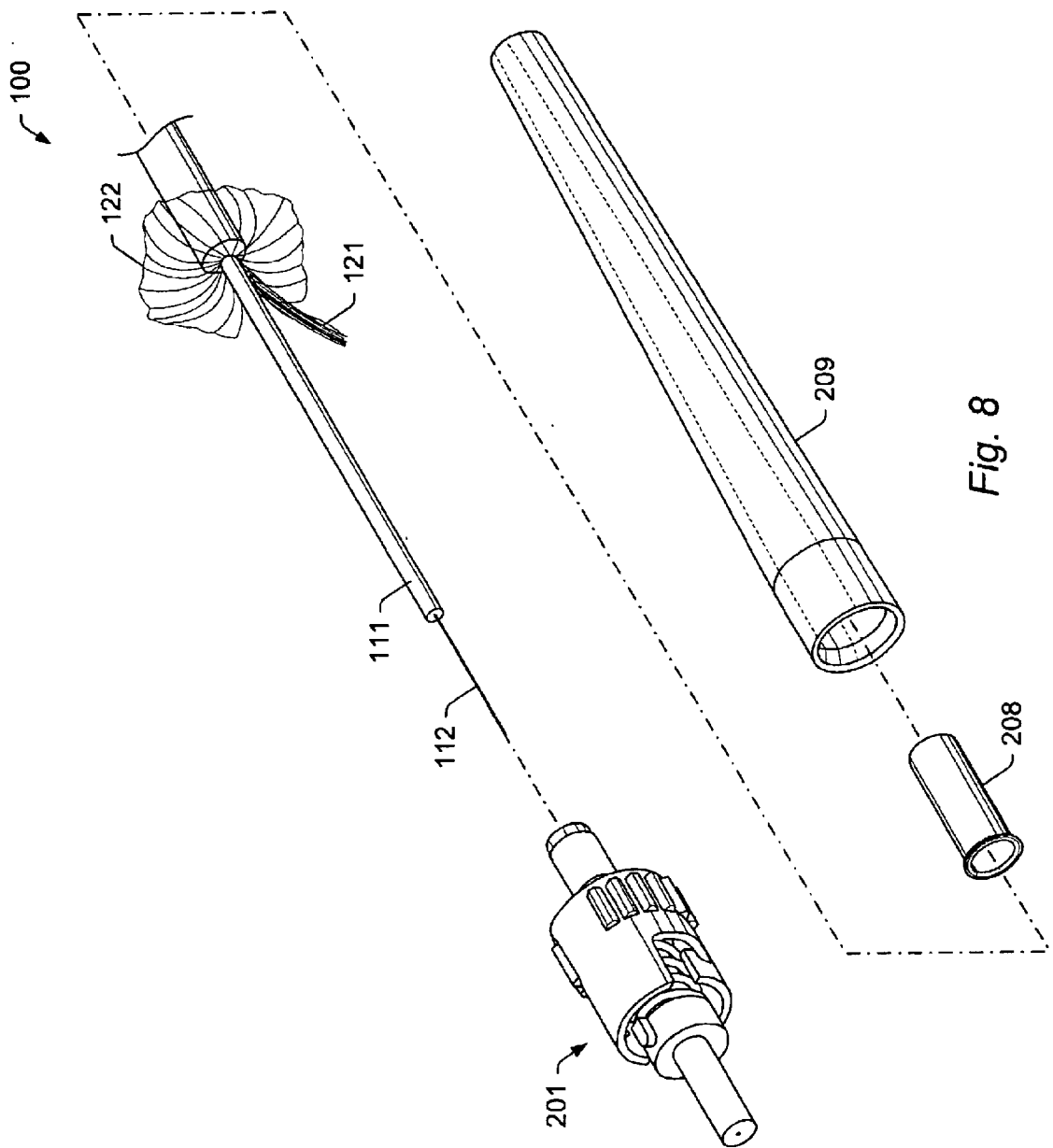

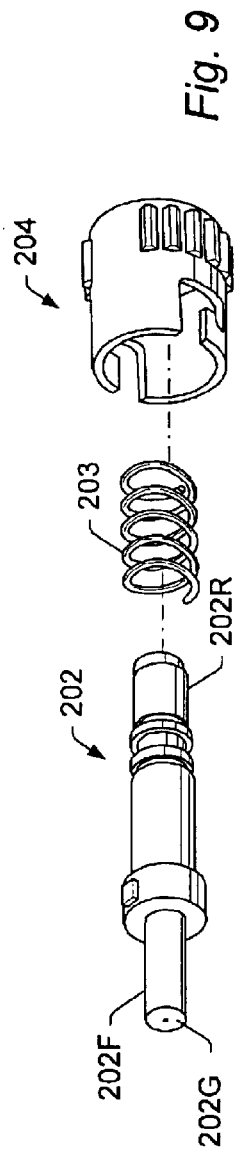
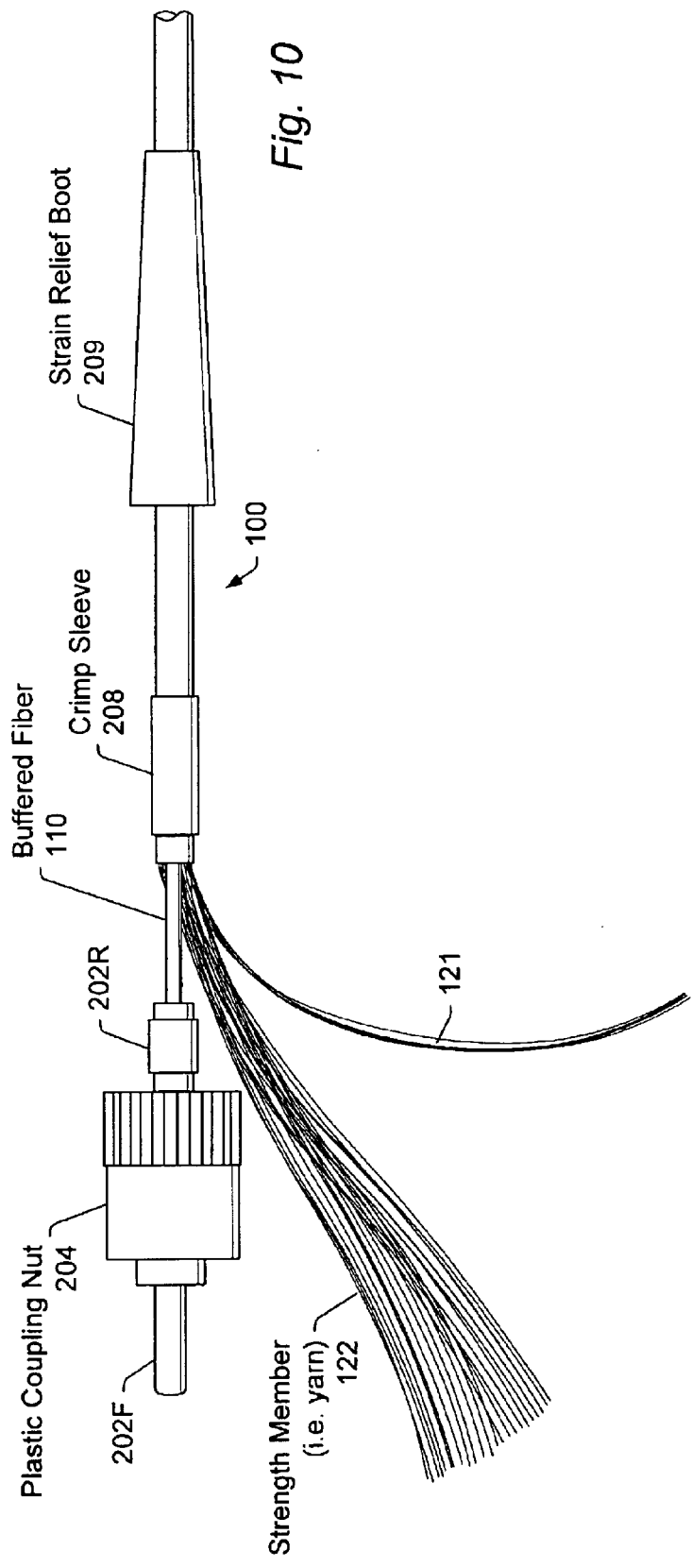

HYBRID ELECTRO-OPTIC CABLE FOR FREE SPACE LASER ANTENNAS

CONTINUATION DATA

This application is a continuation in part of:

U.S. patent application Ser. No. 09/106,826 filed on Jun. 29, 1998 now U.S. Pat. No. 6,348,986, entitled "Wireless Fiber-Coupled Telecommunication Systems Based on Atmospheric Transmission of Laser Signals" which is a continuation in part of:

U.S. patent application Ser. No. 08/625,725 filed on Mar. 29, 1996, now U.S. Pat. No. 5,786,923, entitled "Point-to-Multipoint Wide Area Telecommunications Network via Atmospheric Laser Transmission Through a Remote Optical Router".

FIELD OF THE INVENTION

The present invention relates generally to the technology of free-space optical communication, and more particularly, to a hybrid cable for establishing simulaneous optical and electrical connectivity between two devices.

DESCRIPTION OF THE RELATED ART

In the modern telecommunications market, there exists a vast array of products and services targeted for the needs and desires of consumers at every level. Many of these products and services necessitate a network infrastructure. For example, telephone service is mediated by the Public Switched Telephone Network (PSTN), also known as the Plain Old Telephone System (POTS).

Any-to-any connectivity is a fundamental organizing principle of the PSTN, i.e. any telephone subscriber should be able to call and communicate with any other telephone subscriber. The switching systems employed in the PSTN are almost completely digital. Fiber optic cables, copper cables, microwave links, and satellite links are used for data transmission. Transmission over the local loop is typically carried by copper-based T1 feeder or fiber optic cable. However the subscriber loop is still primarily implemented with copper UTP (unshielded twisted pair). Thus, the transmission bandwidth deliverable to a telephone subscriber is severely limited, typically not more than 56,600 bits per second. At present, the PSTN bears the triple burden of conveying voice, fax, and data communications, and is nearly saturated in certain large metropolitan regions.

The Integrated Services Digital Network (ISDN) represents a step upward in speed relative to the PSTN. First time subscribers to ISDN service generally incur a cost for installation of an ISDN line which comprises upgraded copper wire. Computer users who access a corporate Intranet or the Internet through an ISDN line and ISDN modem experience increased performance relative to connecting through the PSTN.

A variety of communication applications such as interactive television, video telephony, video conferencing, video messaging, video on demand, high definition television (HDTV) and high-speed data services generally require broadband data transmission. In fact, many communication applications may require bandwidths high enough to exclude ISDN as a feasible medium for establishing a data connection.

Optical fiber offers significantly higher data transmission bandwidths than copper wire/media. However, fiber optic networks such as Fiber To The Curb (FTTC) and Fiber To The Home (FTTH) require new fiber optic cable to be run to every subscriber. Thus, the cost of implementing a fiber optic network may be exorbitant. Other alternatives for increasing the capacity of existing networks include Asymmetric Digital Subscriber Line (ADSL), Symmetric Digital Subscriber Line (SDSL), and Hybrid Fiber Coax (HFC), among others.

In general, hard-wired networks are burdened with the requirement of laying cable to new subscribers/nodes. Furthermore, it is difficult to reconfigure the topology of an existing hard-wired network since cables are quite often buried underground, suspended from poles, or strung through the interstitial spaces of office buildings.

In contrast, wireless networks based on the transmission of radio-wave electromagnetic energy through free space (i.e. the atmosphere) are able to service subscribers without incurring costs for laying cable to the subscribers. Many wireless telecommunication systems are organized as broadcast systems where a single transmitter sends an information signal to multiple receivers. For example, the Direct Broadcast Satellite (DBS) systems such as PrimeStar, Digital Satellite Service, etc. provide satellite broadcast of video channels to subscribers equipped with a receiving antenna (typically a dish antenna) and a set-top decoder. Wireless telecommunication systems and networks exploiting the radio spectrum are widespread and numerous. Their numbers continue to increase in response to consumer demand. Thus, the radio spectrum is increasingly crowded, resulting in degraded signal quality and/or increased subscriber costs.

In certain circumstances and for various reasons, a client/customer may desire point-to-point communication, i.e. the transmission of information between two points separated by a distance. For example, a microwave link between two central offices in the PSTN may be a point-to-point connection. Free-space optical systems based on laser technology provide an admirable alternative to radio transmission for establishing broadband point-to-point communication due to the fact that lasers inherently generate narrowly focused beams.

Systems that communicate through free space (e.g. the atmosphere) by means of light beams (e.g. laser beams) are referred to herein as free-space optical (FSO) systems.

In a point-to-point configuration, two FSO transceivers may communicate as suggested by FIG. 1. A first FSO transceiver 10A couples to a communication medium 11A, and a second FSO transceiver 10B couples to a communication medium 11B. The first transceiver 10A receives data from the communication medium 11A, modulates the data onto a light beam LBM1, and transmits the light beam LBM1 through the atmosphere to FSO transceiver 10B. FSO transceiver 10B receives the light beam LBM1, detects the data from the light beam LBM1 and forwards the data to communication medium 11B. Similarly, FSO transceiver 10B receives data from communication medium 11B and sends the data through the atmosphere to FSO transceiver 10A on a modulated light beam LBM2. The FSO transceiver 10A recovers the data from the modulated light beam LBM2 and forwards it to communication medium 11A. For the reasons to be discussed below, the installed cost for point-to-point FSO transceivers is high enough to discourage potential home and small business users.

Many FSO transceiver systems have been developed for establishing point-to-point, bi-directional and high-speed telecommunication through the atmosphere. A FSO transceiver system typically includes (a) active optoelectronic elements which generate and modulate a first light beam and detect/demodulate a second light beam, (b) free-space optical elements which transmit the first light beam into the atmosphere and receive the second light beam from the atmosphere, and (c) a network interface for receiving/sending data from/to a communication medium such as a computer network.

Prior art FSO transceivers typically package the active optoelectronics, free-space optics and network interface together in a common enclosure (i.e. housing). Thus, the transceiver enclosure is often large (in size) and massive. The transceiver enclosure is usually mounted at some outdoor location (e.g. the roof of a building) so that the free-space optics can achieve a light-of-sight to the other FSO transceiver.

The wide range of environmental conditions that are likely to prevail at the outdoor location implies that the transceiver enclosure will generally require weather hardening and environmental control. In particular, a robust temperature control system may be needed to stabilize the active optoelectronics, especially in view of the large size and mass of the transceiver enclosure.

In addition, the transceiver enclosure is power hungry because of the active electronics, network interface and environment control system, and thus, may require the installation of a special power utility connection at the outdoor location. It is noted however that there may be significant difficulty in obtaining outdoor (especially rooftop) electrical utility access, and the conditioning and reliability of rooftop power connections is often found lacking. Potential home and small business customers may be unwilling to pay for the costs associated with installing an outdoor electrical utility connection.

In many situations, the roof of a building is a desirable location for mounting the transceiver enclosure. However, the mass of the transceiver enclosure and its associated mounting structures may create roof loading problems.

The transceiver enclosure should be stably mounted because any positional/angular disturbance to the transceiver enclosure can translate to disturbances in the pointing direction of the antenna optics. The problem of stably mounting the transceiver enclosure is a nontrivial one due to the significant weight and volume of the transceiver enclosure. Large mounting structures may be required.

Newer roof membrane systems often disallow the use of penetration type mounts, and aesthetic or zoning requirements may exclude parapet-mounted devices. So a large and well-ballasted freestanding tripod may be needed for mounting the transceiver enclosure. The amount of ballast required to stabilize a tripod increases radically with tripod size. Thus, a large tripod, besides occupying valuable roof space, can create (or exacerbate) roof loading problems.

Note that the large volume of the transceiver enclosure implies a large profile to the wind, and thus, larger perturbations due to wind loading. The difficulty in obtaining stability of the transceiver enclosure usually necessitates the incorporation of an active-alignment system to continuously monitor and correct the fine pointing of the antenna optics to maintain the line-of-sight to the other FSO transceiver. The active alignment system adds significant cost and weight to an already complex system.

The two transceiver enclosures forming a link need to be aligned so that their antenna optics are pointed at each other. A bore-sighted spotting scope is usually mounted on the outside of each transceiver enclosure to facilitate the alignment. The spotting scope is needed because the typical transceiver enclosure provides no convenient means for intercepting the optical path of the transmit and receive beams. Alignment is often a painstaking and tedious task, requiring many iterations of adjustment between the two communicating transceivers. Furthermore, significant costs may be incurred as one or more trained persons may be required to perform the alignment. It is noted that this fine adjustment may also be accomplished using an active alignment system.

FSO transceiver systems rarely address the need for scalability. To obtain increased bandwidth or enhanced features for the point-to-point link, the transceiver enclosure at each end of the link must typically be removed and replaced. After replacement of the transceiver enclosure, alignment generally needs to the repeated at cost to the consumer. In addition, any repair of an FSO transceiver typically requires the complete replacement and realignment of the transceiver enclosure, which can result in unacceptable downtime. Note that the typical high-power light source has an approximate mean time before failure (MTBF) of ten years or less.

A major portion of the cost of typical FSO communication systems is due to their use of six optoelectronic (OE) interfaces to complete a single point-to-point link as suggested by FIG. 2. A first FSO transceiver, comprised within a first outdoor enclosure 12A, communicates with a second FSO transceiver, comprised within a second outdoor enclosure 12B, by means of atmospherically transmitted light beams. The first outdoor enclosure 12A couples to a media converter 13A through standard communication fibers 14A. The media converter 13A may connect to a hub, switch or concentrator via RJ 45 CAT 5 cable. The media convert 13A may be situated in the telecommunications closet of a first building. Similarly, the second outdoor enclosure 12B couples to a media converter 13B through standard communication fibers 14B. Media converter 13B may connect to another hub, switch or concentrator. Media converter 13B may reside in the telecommunications closet of a second building.

OE interfaces #1 and #2 in media converter 13A and outdoor enclosure 12A respectively are used for the fiber optic data transfer between the media converter 13A and outdoor enclosure 12A. OE interface #3 in outdoor enclosure 12A generates a first information-bearing light beam which is transmitted through the atmosphere to the outdoor enclosure 12B, and detects a second information-bearing light beam received from the second outdoor enclosure 12B. OE interface #4, #5 and #6 perform similar functions at the other end of the link.

The use of six OE interfaces adds significantly to the installed cost of the point-to-point link as the bandwidth is increased. The installed cost must also include the interface requirements needed by the customer to establish communication with the link: at high bandwidths (100 Mbps or more), switches or routers are often needed at each end of the link to re-time the data due to the excessive jitter caused by this number of OE interfaces.

The aforementioned problems associated with typical free-space optical data communication systems have often relegated point-to-point FSO systems to the niche markets. Common applications have included redundant backup links for carrier-class services and solving of rights-of-way problems where trenched or aerial cable is difficult to install.

Therefore, a need exists for an FSO communication system which may be mounted and aligned more simply and efficiently than in prior art systems. An FSO communication system which eliminates the need for outdoor utility power connections and the active alignment of antenna optics would greatly reduce the cost to consumer of an installed system. An FSO communication system with a reduced number of optoelectronic interfaces would similarly lead to cost savings. Any method for circumventing the necessity of re-aligning a FSO communication system upon repair and/or upgrade of the active optoelectronics is greatly to be desired as it would allow the user to protect his/her initial investment in system alignment. Any reductions in the size and/or mass of an FSO communication system and its mounting structures would be very welcome as these would reduce concerns about excessive structural loading. Mechanisms for simplifying user access to the active optoelectronics of an FSO communication system are desirable. In general, a considerable need exists for an FSO communication system which realizes significant cost reductions with respect to prior art systems.

Furthermore, in view of the problems associated with wired networks and radio-transmission based networks, a wireless FSO telecommunication network capable of providing a number of subscribers with high-bandwidth telecommunication services is desired. In particular, a wireless FSO telecommunication network allowing a number of subscribers to communicate with a great number of subscribers is desired.

A wireless FSO telecommunication system is further desired which reduces the cost to each subscriber, yet maintains high-speed bi-directional telecommunication. A system is desired which does not require the large installation costs associated with fiber optic networks, and which does not compete for electromagnetic broadcast bands in the radio spectrum. Such a system could be employed in a wide variety of applications such as telephony, data communications (e.g. Internet access), teleconferencing, audio broadcast, and various television applications such as cable television, HDTV and interactive TV.

SUMMARY OF THE INVENTION

The present invention comprises various embodiments of a hybrid electro-optic cable for establishing a simultaneous electrical and fiber-optic connection between two communication devices. In one set of embodiments, the hybrid cable comprises an optical fiber, an intermediate layer surrounding the optical fiber, and an electrically insulating jacket surrounding the intermediate layer. The intermediate layer includes electrically conductive material, such as a collection of metallic strands. The metallic strands provide the electrical connection between the two communication devices while the optical fiber provides the optical connection between the two communication devices. The intermediate layer may also include a strengthening material (e.g. a yarn such as an aramid yarn) to increase the pull strength of the hybrid cable. The metallic strands may be arranged within the intermediate layer so as to surround the optical fiber.

In one embodiment, the hybrid cable includes a second optical fiber and a second intermediate layer surrounding the second optical fiber. The second intermediate layer includes another collection of metallic strands. The electrically insulating jacket may surround the second intermediate layer in addition to the first intermediate layer mentioned above. The electrically insulating jacket may have a zipcord format.

The hybrid cable may be terminated with a connector having a metallic ferrule. The metallic strands may couple to a rear portion of the metallic ferrule. A metallic crimping sleeve may be configured to slide up over the rear portion of the metallic ferrule to crimp the collection of metallic strands onto the rear portion. The metallic ferrule may be used in connection with nonconductive coupling nut.

The present invention further comprises various embodiments of an adapter for establishing optical and electrical connectivity (e.g. simultaneous optical and electrical connectivity) between two cables. The adapter may include an electrically conductive alignment sleeve, an electrically insulating retainer for retaining the alignment sleeve, and an electrically insulating housing configured to house the retainer. The housing has a first end configured for coupling to a first cable and a second end for coupling to a second cable. The alignment sleeve may have one or splits in its surface so that a resistive tension is generated upon insertion of a ferrule. In one embodiment, the adapter conforms to the ST connector standard.

The present invention further comprises various embodiments of a method for terminating an opto-electronic cable with an opto-electronic connector. The opto-electronic cable has an optical fiber, an intermediate layer comprising metallic strands surrounding the optical fiber and an electrically insulating jacket surrounding the metallic strands. The termination method involves fixing the optical fiber (e.g. with epoxy) in a fiber cavity within a metallic ferrule, placing the metallic strands in proximity to an external end portion of the metallic ferrule, and sliding a metallic crimping sleeve over the metallic strands to crimp the metallic strands onto the external end portion of the metallic ferrule thereby establishing an electrical contact. A strain relief boot may slide over the metallic crimping sleeve to electrically insulate the electrical connection and to provide structural support. The metallic strands may be twisted into a bundle prior to placing the metallic strands in proximity to the external end portion of the metallic ferrule.

The present invention further comprises various embodiments of a communication system composed of a first communication device and a second communication device coupled through one or more hybrid cables as described above. The first communication device may have a power source which is configured to deliver electrical power to the second communication device through the collection of metallic strands. The first communication device may include a light source configured to generate a light beam. The first communication device modulates and transmits the first light beam through a first optical fiber (in one of the hybrid cables) to the second communication device. The first communication device may include an optical receiver for demodulating data from an optical signal received through the first optical fiber (or through a second optical fiber in the same hybrid cable or in a different hybrid cable).

In some embodiments, the second communication device is an optical antenna unit configured to receive a modulated light beam from the first optical fiber and to transmit the first light beam into the atmosphere. Conversely, the optical antenna unit may be configured to receive a portion of a modulated light beam from the atmosphere and to send this portion to the first communication device through the first optical fiber (or a second optical fiber in the same hybrid cable or a different hybrid cable). The optical antenna unit may include a resistive (or other kind of) heating element which receives electrical power transmitted through the collection of metallic strands from the first communication device.

In one embodiment, the first communication device may include a light source and a safety control system. The safety control system may be configured to detect an open loop condition in an electrical circuit which runs out to and back from the second communication device through the one or more hybrid cables. The safety control system is configured to turn off the light source (or decrease the power output of the light source to an eye-safe level) in response to detecting the open loop condition. Thus, if the hybrid electro-optic cable is cut or disconnected, this causes an open loop condition in the electrical circuit, which results in the light source being automatically turned off (or turned down). This prevents a user from accidentally being harmed by the light emanating from the free end of the optical fiber when the hybrid electro-optic cable is cut. More generally, any of a variety of electrically related functions may be supported by the electrical connection(s) of the hybrid cable(s).

The first communication device may be situated at a first location internal to a building, and the second communication device may be an optical antenna unit situated at a second location external to the building. The first communication may be configured for coupling to a host computer.

In some embodiments, the first communication device is a point-to-point transceiver unit and the second communication device is an optical antenna unit.

In other embodiments, the first communication device is a point-to-multipoint optical transceiver unit and the second communication device is an optical antenna unit.

In one set of embodiments, the first communication device and second communication device are fiber optic transceivers which transfer data through the fiber optic connection(s) provided by the one or more hybrid cables. The electrical connection(s) provided by the one or more hybrid cables allows the communication devices to perform electrical related functions as suggested above.

The present invention further comprises various embodiments of a method for manufacturing a hybrid cable. The method comprises (a) arranging spools of metallic fiber on a wheel, (b) pulling a length of optical fiber through the center of the wheel, and (c) rotating the wheel to induce wrapping of the metallic fibers around the optical fiber as the optical fiber is pulled through the center of the wheel. In addition, spools of yarn material may be arranged on the wheel. As the wheel is rotated, the strands of yarn material may also wrap around the optical fiber.

The method may further include covering the metallic fibers, the yarn material and the optical fiber with a surrounding jacket (i.e. an electrically insulating jacket).

The present invention further comprises an adapter for coupling to an eletro-optic cable. In one set of embodiments, the adapter comprises an electrically insulating bulkhead connector and a metallic clip with a central tang. The central tang may have a hole for the admission of a ferrule (especially a metallic ferrule). The bulkhead connector may have a threaded end for screwing into a complementary structure (e.g. into a hole in the housing of an optical antenna). The metallic clip may have a series of crimp fingers for coupling to an electrical wire.

The present invention further comprises various communication system embodiments which involve the separation of an indoor optoelectronics module (or package) from an outdoor optical antenna unit. This approach provides significant benefits to the small and medium size business market in terms of scalability, reliability, and costs of installation and maintenance.

In one set of embodiments, a wireless optical transceiver system includes an optical antenna unit coupled via hybrid cable to an optoelectronics module. The transceiver system receives and transmits light beams from/to the atmosphere, and thereby communicates optically with a second optical transceiver. The isolation between the optoelectronics module and optical antenna unit provided by the hybrid cable has a host of implications which reduce the initial system cost and ongoing maintenance costs to the user. In particular, the optical antenna unit, free from the encumbering influence of optoelectronic system components, may be installed more easily and efficiently. Line of sight to a target antenna may be achieved by disconnecting the hybrid cable from the optical antenna and visually observing through the optical path of the optical antenna. Furthermore, the isolation implies that a utility power connection is not needed at the site of the optical antenna. This results in significant savings to the user/client.

In addition to an optical transceiver system, the present invention also contemplates receivers, transmitters, repeaters, switches and routers, or any combination thereof configured according to the principle of hybrid cable isolation between optical antenna units and optoelectronics modules. Such components are admirably suited for use in various network configurations such as broadcast networks, bi-directional communication networks, point-to-multipoint networks, point-to-point links, etc. due to their low cost, ease of installation and antenna sighting, modularity, and upgradability.

BRIEF DESCRIPTION OF THE DRAWINGS

A better understanding of the present invention can be obtained when the following detailed description of the preferred embodiments are considered in conjunction with the following drawings, in which:

FIG. 8 illustrates the part of a connector assembly in relation to a end portion of hybrid cable 100;

FIG. 9 illustrates into exploded view several parts of a connector assembly;

FIG. 10 illustrates in hybrid cable 100 at an intermediate stage of the termination processor, i.e. just prior to crimping of metallic wire and yarn to the rear of the metallic ferrule;

DETAILED DESCRIPTION OF THE PRESENT INVENTION

U.S. Pat. No. 5,786,923 issued on Jul. 28, 1998 entitled "Point-to-Multipoint Wide Area Telecommunications Network Via Atmospheric Laser Transmission Through A Remote Optical Router" is hereby incorporated by reference in its entirety.

U.S. patent application Ser. No. 09/106,826 filed on Jun. 29, 1998 entitled "Wireless Fiber-Coupled Telecommunication Systems Based on Atmospheric Transmission of Laser Signals" is hereby incorporated by reference in its entirety.

U.S. Pat. No. 4,834,487 issued on May 30, 1989 entitled "Optical Connector with Plastic Alignment Ferrule" is hereby incorporated by reference in its entirety.

U.S. Pat. No. 5,052,774 issued on Oct. 1, 1991 entitled "Connector for a fiber optic cable" is hereby incorporated by reference in its entirety.

U.S. Pat. No. 5,129,023 issued on Jul. 7, 1992 entitled "Optical Fiber Connector Having Enhanced Provisions for Interconnection and for Prevention of Optical and Mechanical Disconnection" is hereby incorporated by reference in its entirety.

U.S. Pat. No. 5,170,452 issued on Dec. 8, 1992 entitled "Fiber Optic Plug Connector and Adapter Therefor" is hereby incorporated by reference in its entirety.

U.S. Pat. No. 6,022,150 issued on Feb. 8, 2000 entitled "Fiber Optic Connector" is hereby incorporated by reference in its entirety.

Hybrid Cable for Parallel Electrical and Fiber-Optic Connectivity

Figure 1:
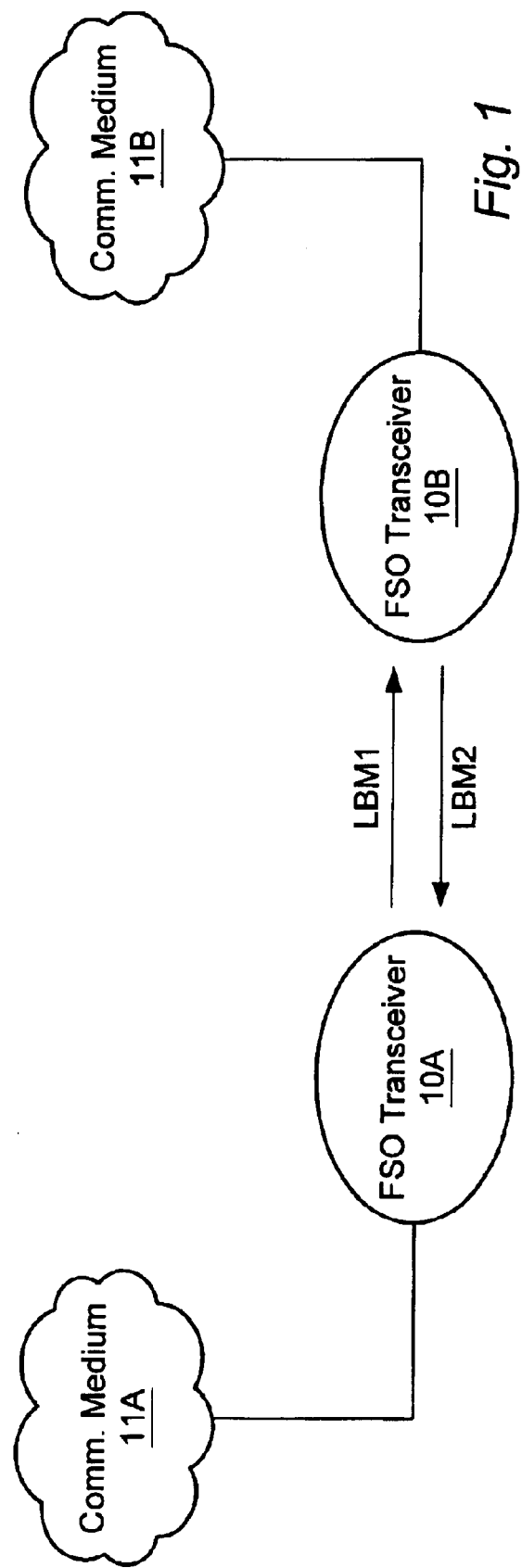
FIG. 1 illustrates two FSO transceivers in a point-to-point communication configuration.
Figure 2:
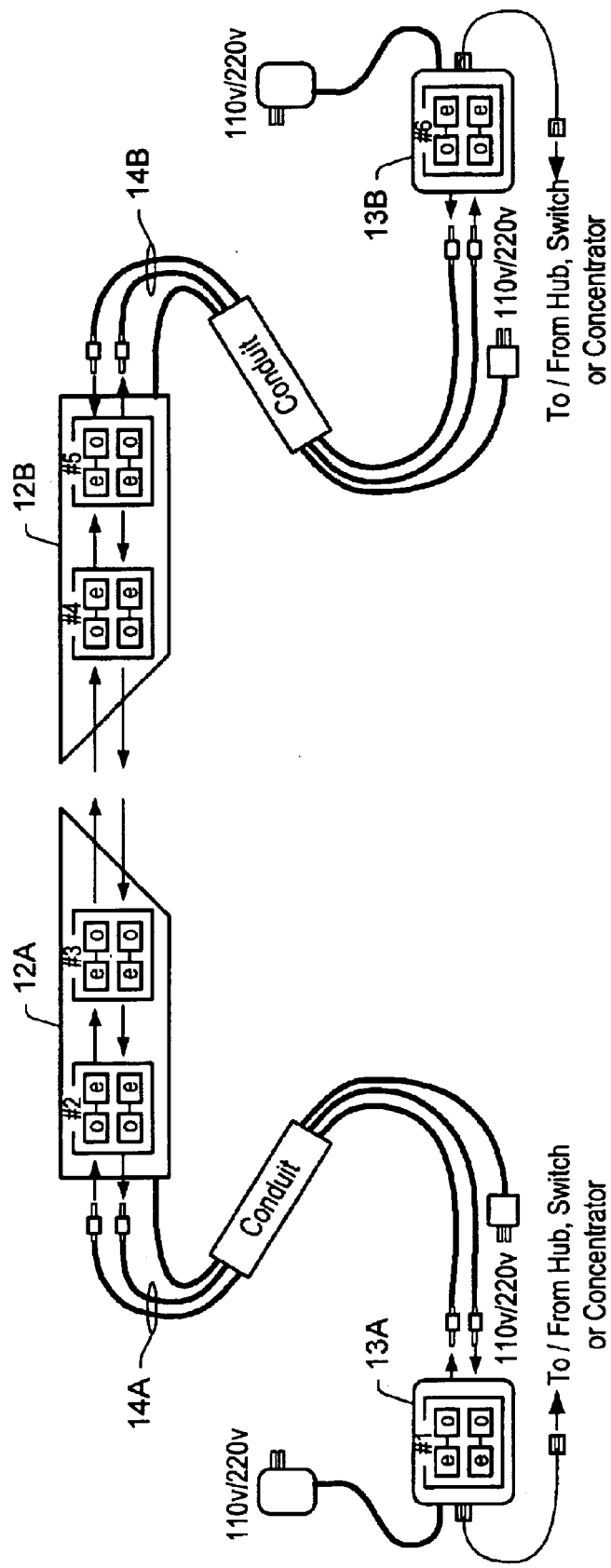
FIG. 2 illustrates a typical point-to-point FSO link that inlcudes six optoelectronic (OE) interfaces.
Figure 3:
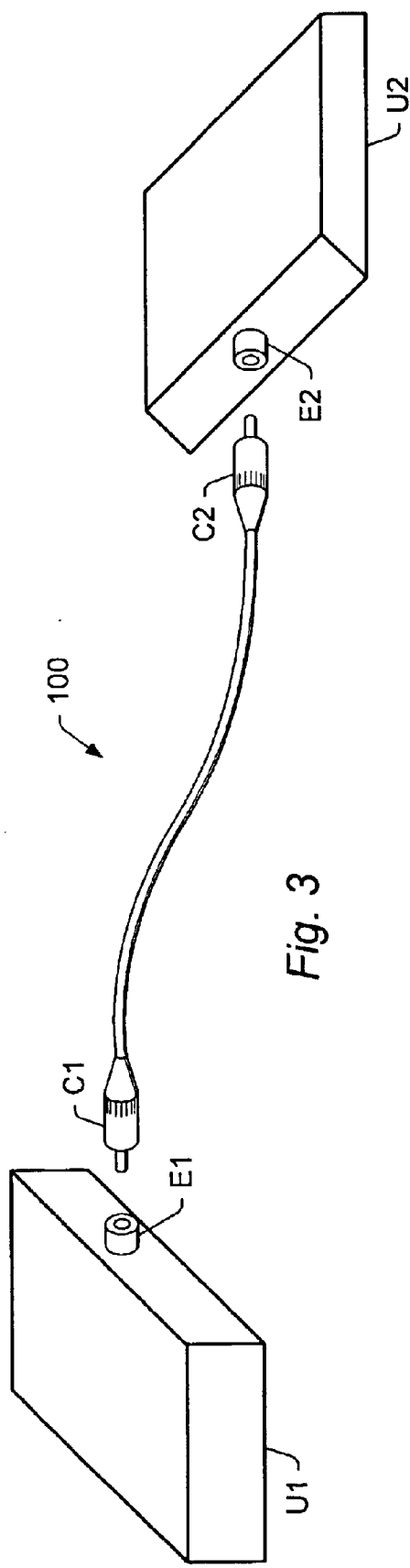
FIG. 3 illustrates two communication systems (or devices) connected by a hybrid electo-optic cable 100.

The present invention comprises various embodiments of a hybrid cable for providing electrical and fiber-optic connection (e.g. simultaneous electrical and fiberoptic connection) between two systems. FIG. 3 illustrates one embodiment of the hybrid cable referred to herein as hybrid cable 100. Hybrid cable 100 is configured for the conduction of optical and electrical signals. As defined herein, the term "optical signal" includes any signal that may be effectively conveyed through an optical fiber. Thus, optical signals include infrared and ultraviolet signals as well as visible light signals.

Hybrid cable 100 may have a terminating connector at each end to ease the process of connecting the cable to systems (or to other cables). The connector C1 at one end and the connector C2 at the other end may be of the same or different types. For example, the connectors may be ST, FC, SMA, D4, Din, Biconic, Mini-BNC or SC connectors.

Figure 4:
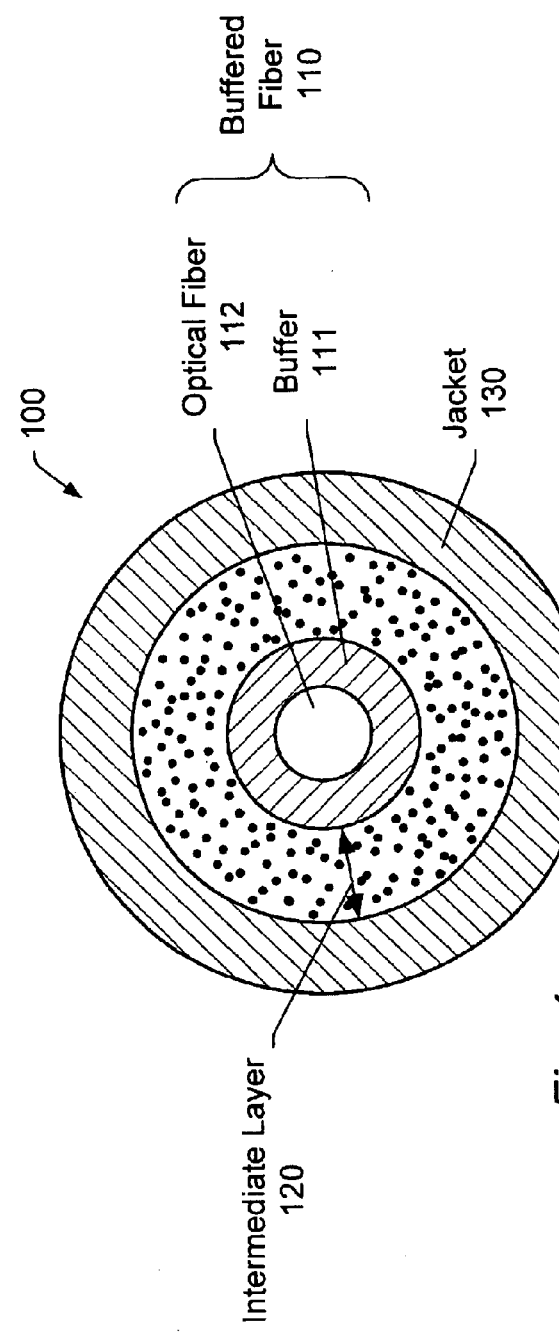
FIG. 4 illustrates a cross section of one embodiment of hybrid cable 100.

As illustrated in FIG. 4, hybrid cable 100 comprises a buffered optical fiber 110, an intermediate layer 120 surrounding the buffered optical fiber, and an electrically insulating jacket 130 surrounding the intermediate layer. The intermediate layer 120 comprises an electrically conductive material. In one embodiment, the electrically conductive material comprises a collection of metallic strands (denoted as small dots). The metallic strands are made of an electrically conductive metal such as copper. Alternatively, the electrically conductive material may be other types of material that conduct electricity, as is known in the art.

The buffered optical fiber 110 comprises a central optical fiber 112 surrounded by a buffer 111 (e.g. a polyvinyl chloride buffer) that protects the central optical fiber.

The jacket 130 may be made of flexible coating material such as polyvinyl chloride. The flexible coating material may contain colorants for easy identification as well as additives to protect the cable from environmental stresses such as ultra-violet light.

In one set of embodiments the intermediate layer comprises a strengthening material. The strengthening material assists in bearing stresses that would otherwise be borne by the more fragile buffered optical fiber 110. For example, the strengthening material may comprise strands of yarn such as aramid yarn or other types of yarn. The yarn strands and metallic strands may be distributed in the intermediate layer according to any of a variety of schemes. In FIG. 4, the metallic strands are distributed throughout the intermediate layer with yarn strands in the space between the metallic strands.

Figure 5:
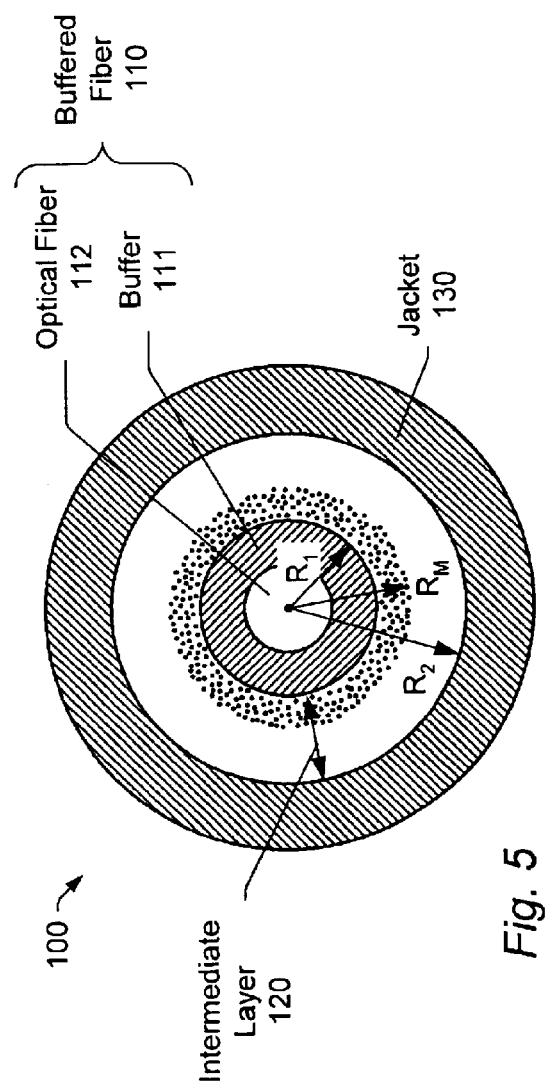
FIG. 5 illustrates a cross section of another embodiment of hybrid cable 100.

Alternatively, the metallic strands may be confined to or concentrated in some subregion of the intermediate layer. For example, the metallic strands may be distributed or more concentrated in an approximately annular subregion within the intermediate layer as suggested by FIG. 5. Let $R_1$ denote the inner radius of the intermediate layer at its inner boundary with the optical fiber. Let $R_2$ denote the outer radius of the intermediate layer at its outer boundary with the insulating jacket 130. The metallic strands may be distributed in or more concentrated in the annular region between radius $R_1$ and $R_M$, where $R_M$ is larger than $R_1$ and smaller than $R_2$, while the yam strands may be distributed or more concentrated in the annular region between $R_M$ and $R_2$.

Figure 6:
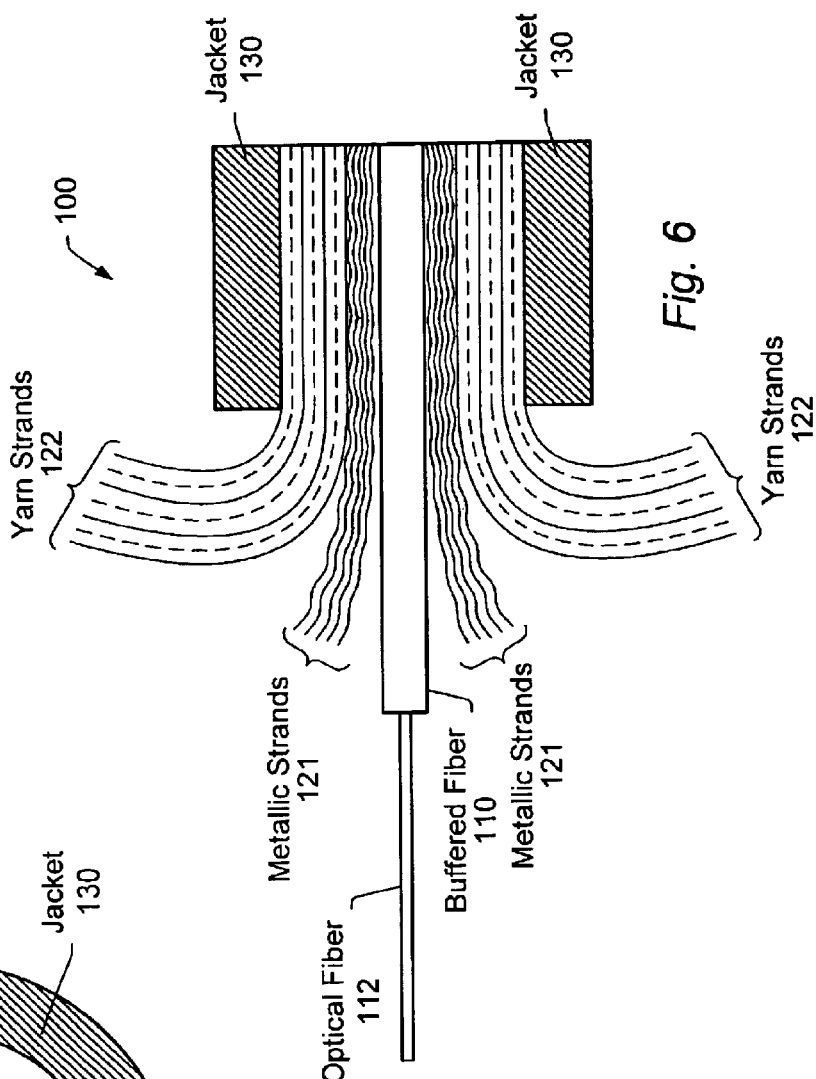
FIG. 6 illustrates a longitudinal section of one embodiment of hybrid cable 100.
Figure 7:
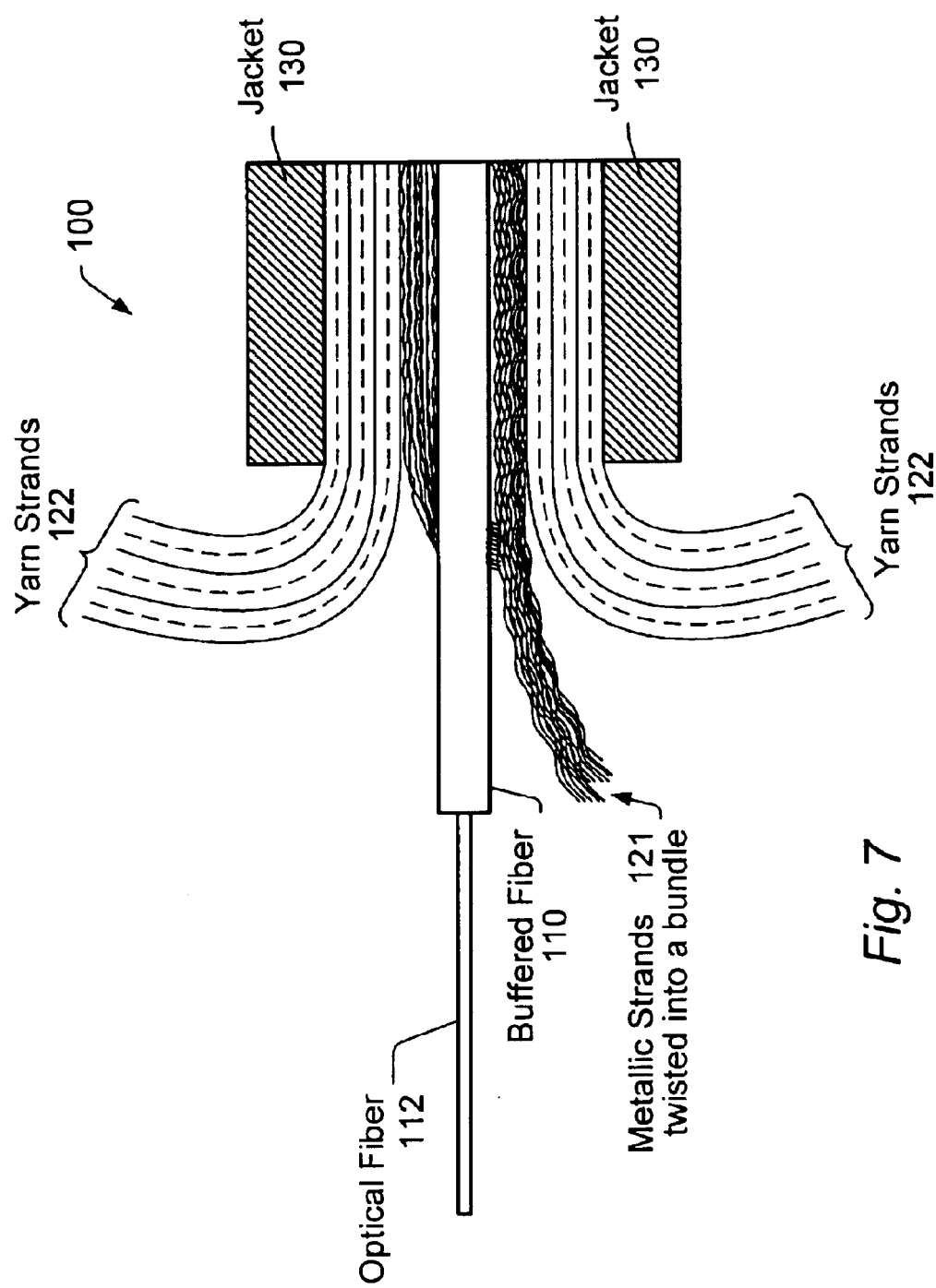
FIG. 7 illustrates the twisting of metallic wires 121 into a bundle prior to termination with a connector.

An end portion of the jacket 130 may be cut back to expose a length of the metallic strands 121, the yam strands 122 and the buffered optical fiber 110 as shown in FIG. 6. In addition, the buffer 111 may be cut back to expose a length of the optical fiber 112. The exposed metallic strands may be isolated from the exposed yarn strands by gently blowing on the exposed end. The yarn strands being lighter and more flexible will bend out of the way of the metallic strands. Thus, one may grab the exposed metallic strands and twist them into a bundle as suggested by FIG. 7.

The connector C1 terminates the optical fiber 110 and the collection of metallic strands at one end of hybrid cable 100 and is configured to mate with a complementary connector E1 mounted on a fiber-optic communication system U1 (e.g. an optical transmitter, receiver, transceiver or an optical antenna unit) as suggested by FIG. 3. Similarly, connector C2 terminates the optical fiber 110 and the collection of metallic strands at the opposite end of the hybrid cable 100, and is configured to mate with a complementary connector E2 on a second system U2. Connectors C1 an C2 and complementary connectors E1 and E2 have special features that support the electrical and optical connectivity provided by hybrid cable 100.

When the two systems U1 and U2 are coupled through hybrid cable 100, the two devices are connected electrically through the metallic strands and optically through optical fiber 110. The two system U1 and U2 may transfer light beams in either or both directions through the optical fiber 110. In addition, the two systems U1 and U2 may use the electrically conductive connection afforded by the metallic strands to perform any of a variety of functions. For example, system U1 may provide electrical power to system U2 through the electrical connection (in conjunction with a second conductor as the conveyance of power generally requires two conductive connections—one active path and one ground path). As another example, systems U1 and U2 may transfer information-bearing electrical signals through the electrical connection.

Any connector used to terminate hybrid cable 100 should support the electrical connectivity function of hybrid cable 100 as well as the optical connectivity function. This suggests that at least some portion of the connector be made of an electrically conductive material such as metal or metal alloy. The electrically conductive portion is configured to couple to the metallic strands of hybrid cable 100 and to an electrically conductive portion of the complementary connector.

Connectors C1 and C2 are configured to support the optical and electrical connectivity functions of hybrid cable 100. FIG. 8 illustrates the elements of a ST type connector assembly kit in relation to an exposed end of the hybrid cable 100. The connector assembly kit includes an end unit 201, crimp sleeve 208 and a strain relief boot 209. Such a connector assembly kit may be used to assemble connector C1 and/or connector C2. It is noted that principles described below for terminating hybrid cable 100 with an ST connector naturally generalize to various other types of fiber optic connectors.

FIG. 9 illustrates the elements of end unit 201. End unit 201 comprises a fiber ferrule 202, a spring 203 and a coupling nut 204 (e.g. a quarter-turn coupling nut). The fiber ferrule 202 is made of an electrically conductive material (e.g. stainless steel, or more generally, any metal or metal alloy) while coupling nut 204 is made of an electrically nonconductive material such as a plastic or ceramic. The nonconductive coupling nut 204 electrically insulates the conductive ferrule 202 from the environment, and thus, may prevent inadvertent short circuits from occurring. For example, if the metallic strands, and thus the conductive ferrule 202, were carrying power, it would be important to shield the conductive ferrule 202 from accidental contact with ground.

Conductive fiber ferrules and nonconductive coupling nuts are widely available products. However it is noted that sellers of these products are currently accustomed to selling connector assembly kits with metallic ferrule and metallic coupling nut or kits with plastic end unit and plastic coupling nut because prior art technologies have provided no reason for them to supply mixed kits including a conductive ferrule and nonconductive coupling nut. With the market deployment of the inventions described herein, such a reason will be provided and the marketing of such mixed kits is anticipated.

An appropriate length of the exposed bundle of metallic strands 121 may be placed into contact with a rear portion 202R of the conductive ferrule 202 and crimped into firm contact with the rear portion by crimping sleeve 208. While twisting the metallic strands into a bundle assists in the establishment of a firm physical contact of the strands with the rear portion 202R, in alternative embodiments, twisting of the metallic strands may be omitted.

In those embodiments where yarn material 122 is included in the intermediate layer 120, the yarn material 122 and the bundle of metallic strands are together crimped into firm contact with the rear portion 122R of the conductive ferrule 202. Care should be taken that the metallic strands come into direct contact with the rear portion 202R without yarn strands intervening. Intervening yarn strands could prevent a good electrical contact. The rear portion 202R may have a serrated or otherwise roughened surface to assist in the creation of positive contact during crimping.

FIG. 10 illustrates the elements of the connector assembly kit in position prior to crimping of the bundle of metallic strands 121 and the yarn material 122 to the rear portion 202R of the conductive ferrule 202. The exposed fiber portion and exposed buffer portion have been inserted into conductive ferrule 202. The exposed metallic bundle 121 and yarn material 122 is trimmed to an appropriate length to fit over the rear portion 202R. Jacket 130 slides up and abuts against rear portion 202R. The crimp sleeve 208 slides up over the rear portion 202R trapping the metallic strands and yarn material between the crimp sleeve 208 and the rear portion 202R. The crimp sleeve 208 may be crimped forcing the metallic strands and yarn material into tight contact with the rear portion 202R. The strain relief boot 209 slides up over the rear portion 202R to provide extra support.

In one alternative embodiment, an electrical contact between the bundle of metallic stands 121 and the read portion 202R of the conductive ferrule 202 may be established by soldering the bundle to the rear portion.

Hybrid Adapter

Figure 11:
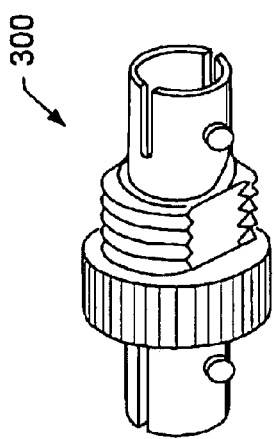
FIG. 11 illustrates one embodiment of an adapter 300 for extending an electo-optic connection.

The end unit 202 is configured for coupling to a complementary connector. The complementary connector may be mounted on a supporting structure such as the chassis of a fiber-optic communication system. FIG. 11 illustrates one embodiment of the complementary connector referred to herein as adapter 300. Adapter 300 is an ST-type bulkhead connector and thus admits coupling with any two ST-terminated cables (or fibers). However, adapter 300 has special provisions to support electrical connectivity as well as optical connectivity as explained below.

Figure 12A:
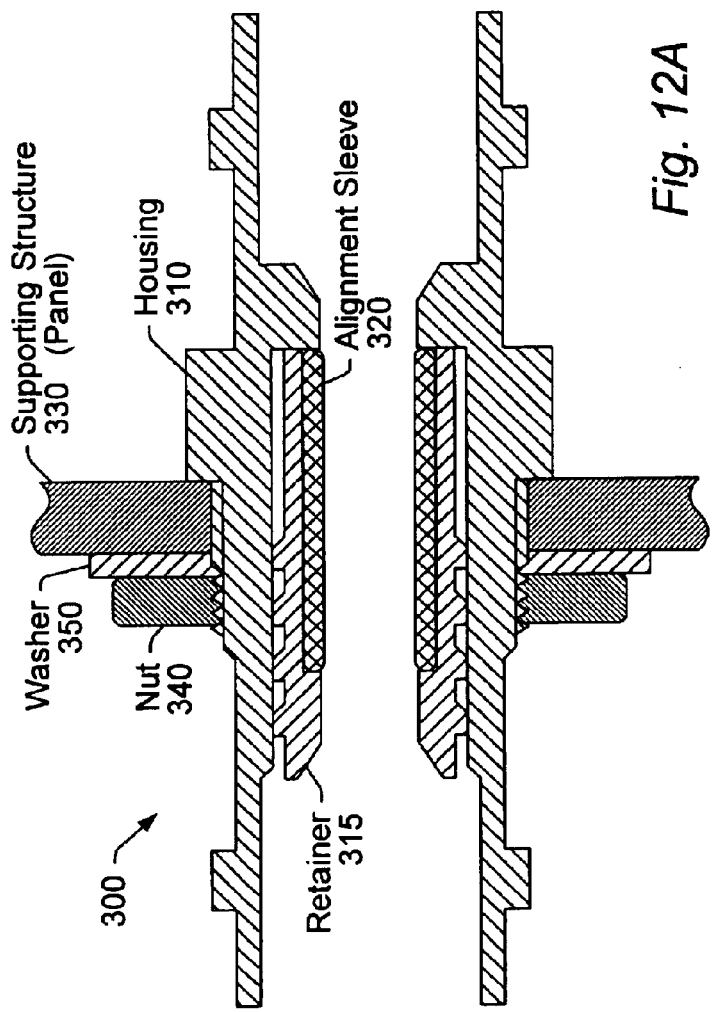
FIG. 12A illustrates one embodiment of adapter 300.

FIG. 12A illustrates a cross-sectional view of adapter 300. Adapter 300 includes a housing 310, a retainer 315, and a split alignment sleeve 320. The adapter 300 may be mounted on a supporting structure 330 with a nut 340 and locking washer 350. The adapter 300 slips through a hole in the supporting structure, and the supporting structure is compressed between the washer and a radially extending flange of the body 310 as the nut is tightened.

Figure 12B:
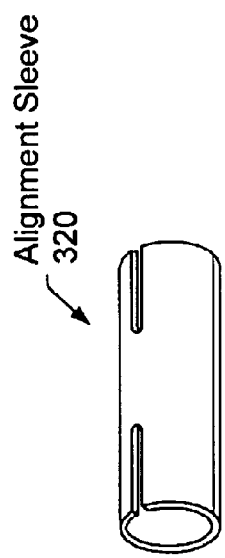
FIG. 12B illustrates a split alignment sleeve 320 which is part of adapter 300 in one embodiment.

The alignment sleeve 320 is made of an electrically conductive substance such as a metal or metal alloy. For example, brass is a suitable conductive substance. The alignment sleeve has at least one split that starts from an end of the alignment sleeve and runs longitunally (i.e. parallel to the axis of the alignment sleeve). FIG. 12B illustrates one embodiment of the alignment sleeve 320 having two splits, one starting from each end. In other embodiments, the alignment sleeve 320 has more than one split starting from each end.

Thus, the leading portions (e.g. front portion 202F) of two conductive ferrules which are inserted into alignment sleeve 320 from opposite ends of the alignment sleeve will be in electrical contact with each other through the alignment sleeve 320. As the leading portion of a ferrule is inserted into alignment sleeve 320, the split(s) gives a bit and generates a contact tension force between the ferrule and the inside surface of alignment sleeve 320 which ensures a good electrical contact. The two ferrules abut against each other face to face in the alignment sleeve. The alignment sleeve serves to align the fiber channels of the two ferrules so there is minimal loss of light energy in transition between the two fibers.

The housing 310 of adapter 300 may be made of one or more electrically nonconductive substances such as plastics to insulate the alignment sleeve 320. The retainer 315 may be made of nonconductive substance such as plastic. However, if desired, the retainer 315 may be made of an electrically conductive substance.

While the principle of using a conductive alignment sleeve to support an electrical connection as well as an optical connection between two conductive ferrules has been described in terms of an ST-type bulkhead connector, embodiments of the invention may be used with any of various connector types. It is recognized that users may need to couple a terminating connector of one type to a terminating connector of the same type or of a different type. Thus, the present invention contemplates a variety of adapter embodiments for coupling terminating connectors of various types.

In one typical usage, adapter 300 is mounted in a supporting structure such as a chassis of a fiber-optic communication system (i.e. a system that sends and/or receives light signals through one or more optical fibers). In this usage, adapter 300 will have an outside end to which external cables may connect and an inside end to which optical and/or electrical devices may connect. As used herein the term electrical device is intended to include any device which sources and/or sinks electrical current.

The end unit 201 which terminates the hybrid cable engages and locks onto the housing 310 at the outside end of adapter 300. ST bulkhead connectors use a bayonet locking mechanism. However, any of a variety of locking mechanisms may be used instead.

Y-Cable

Figure 13:
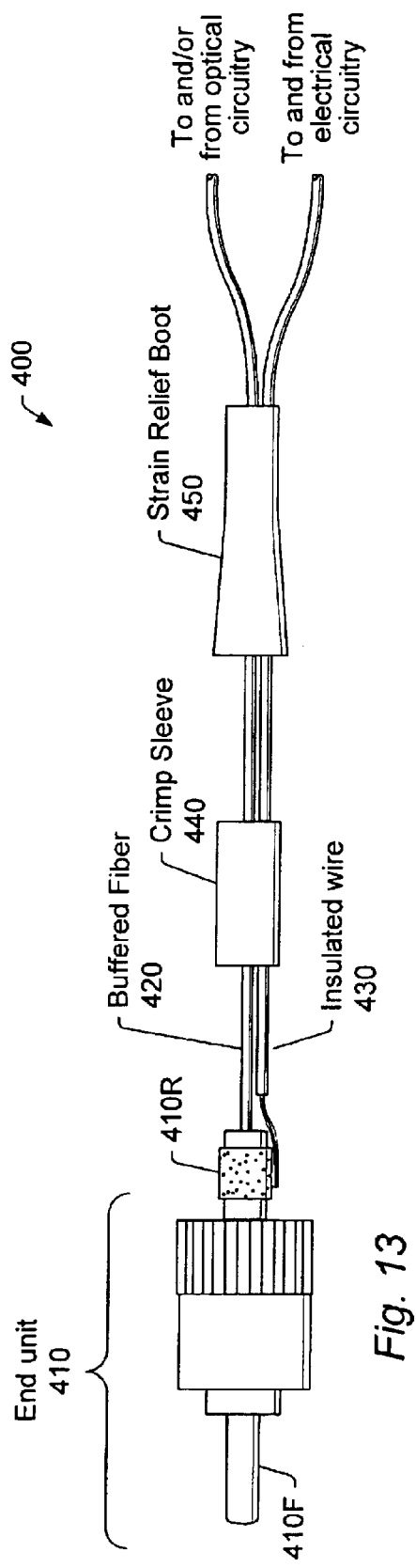
FIG. 13 illustrates one embodiment of a Y-cable 400 particularly suitable for splitting out the electrical and optical paths from an electo-optic adapter mounted on the chassis of an optoelectronic unit.

FIG. 13 illustrates one embodiment of a Y-cable 400 for coupling an electrical device and an optical device to the interior end of adapter 300. Y-cable 400 includes an end unit 410, a buffered optical fiber 420 and an insulated wire 430. The end unit 410 is configured similarly (or identically) to end unit 201 with a conductive ferrule and nonconductive coupling nut. End unit 410 couples to adapter 300 at its interior end.

An end portion of the optical fiber may be exposed by cutting back the buffer coating, and the end portion may be inserted and affixed (e.g. with epoxy) within the central fiber channel of the conductive ferrule of end unit 420. Insulated wire 430 may be conventional electrical wire (e.g. copper wire) covered with conventional insulation. An end portion of the insulation may be cut back to expose the electrical wire.

A crimping sleeve 440 and strain relief boot 450 may be slipped over the buffered fiber 420 and insulated wire 430 prior to coupling with end unit 410 as shown in FIG. 13. Crimping sleeve 440 slides up over a rear portion 410R of end unit 440 forcing the exposed end portion of the wire 430 into contact with the rear portion 410R. The crimping sleeve may be crimped to secure the contact of the wire 430 to end unit 410. Strain relief boot 450 slides up and over the crimp sleeve 440 to provide support to the buffered fiber 420. ST connector assembly kits often contain two strain relief boots, one for terminating jacketed fiber cable (i.e. cable having a buffered fiber, supporting yarn and jacket) and the other for terminating just the buffered fiber. Strain relief boot 450 is of the second type of boot.

Rearward of the strain relief boot, the buffered optical fiber 410 couples to an optical device and the insulated wire 430 couples to an electrical device. The electrical device may be a power supply, a resistive heating element, an electronic transmitter, receiver or transceiver, a signal detector (e.g. a current detector), etc. The optical device may be an optical receiver configured to demodulated data from the light signals received via fiber 410, an optical transmitter configured to transmit data-modulated light signals through fiber 410 or an optical transceiver configured to both receive and transmit optical signals through fiber 410.

In alternative embodiments, a conductive wire and a buffered wire may be coupled to end unit 410 without crimp sleeve 440 and/or strain relief boot 450. For example, the exposed portion of the wire may be soldered to rear portion 410R.

Adapter 300 geometrically conforms to relevant standards for ST bulkhead connectors. Thus, it may be used to couple any two ST-terminated cables. However, because of its conductive alignment sleeve and nonconductive housing, adapter 300 is especially suited for electrically and optically coupling one hybrid cable to another hybrid cable, or, one hybrid cable to a Y-cable.

Connecting Two Systems with Hybrid Cable(s)

Figure 14:
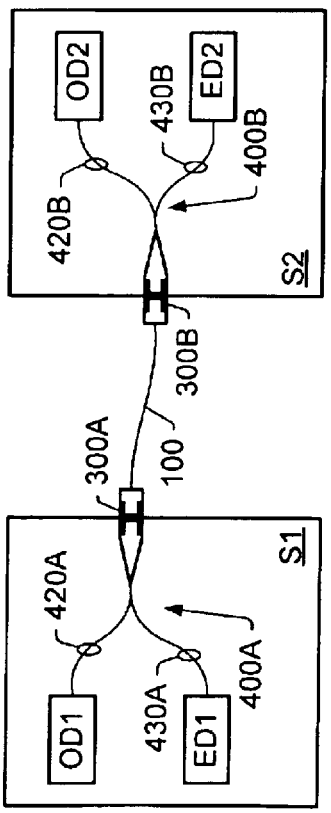
FIG. 14 illustrates one embodiment of a method for electrically and optically connecting two systems S1 and S2 with a hybrid cable 100.

FIG. 14 illustrates one embodiment of a method for electrically and optically connecting two systems S1 and S2. Adapters 300A and 300B similar (or identical) to adapter 300 described above are mounted on the chassis of system S1 and system S2 respectively. The end connectors C1 and C2 of hybrid cable 100 couple to the two adapters 300A and 330B respectively. Y-cable 400A, similar (or identical) to Y-cable 400 described above, is used to couple optical device OD1 and electrical device ED1 to the interior side of adapter 300A. Y-cable 400B, similar (or identical) to Y-cable 400 described above, is used to couple optical device OD2 and electrical device ED2 to the interior side of adapter 300B. The buffered fiber 420A and insulated wire 430A of Y-cable 400A couple to optical device OD1 and electrical device ED1 respectively. Thus, a fiber optic connection is established between optical device OD1 and optical device OD2, and an electrical connection is established between electrical device ED1 and electrical device ED2. The buffered fiber 420B and insulated wire 430B of Y-cable 400B couple to optical device OD2 and electrical device ED2 respectively.

Optical devices OD1 and OD2 send light beams through the fiber-optic connection in either or both directions. The electrical connection may be used to transfer electrical power and/or information signals between electrical devices ED1 and ED2.

In one embodiment, optical device OD1 may include a light source such as a laser which generates the light energy which is transmitted through the fiber-optic connection. There are four couplings (i.e. two at each of adapters 300A and 300B) which make up the optical and electrical connection between systems S1 and S2. When a person decouples any of the four couplings, it is important to shut off the light source (or decrease the emitted power of the light source to an eye-safe level) because light energy emitted from the free end of a cable or adapter could damage the person's eyes. Similarly, any light source associated with optical device OD2 would also need to be cut off (or cut down in response to the decoupling. It is noted that this same issue of safety is associated with accidental severance of hybrid cable 100. If hybrid cable 100 is severed, it would be important to immediately shut off any light sources (or at least cut down the emitted power of the light sources to an eye-safe level) because light energy radiating out of the severed ends of the hybrid cable could damage a person's eye. Thus, one or both of electrical devices ED1 and ED2 may be configured to detect a break in the electrical connection between ED1 and ED2 (e.g. by detecting a change in some electrical property associated with the electrical connection), and to shut off (or cut down) any light sources in response to the breakage.

Figure 15:
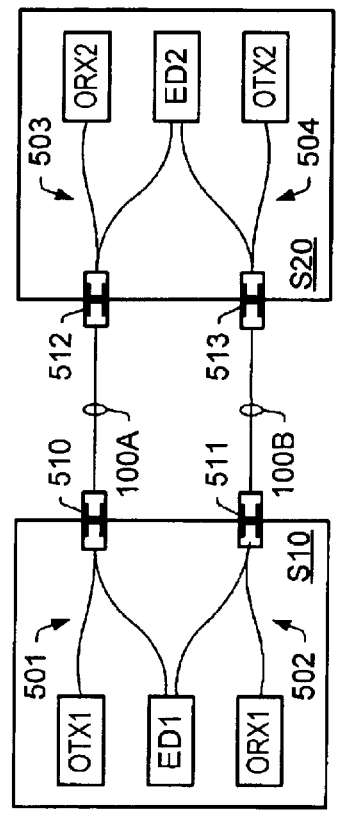
FIG. 15 illustrates one embodiment of a method for electrically and optically connecting two systems S1 and S2 with two or more hybrid cables.

In some embodiments, two systems S10 and S20 may be coupled optically and electrically with two or more hybrid cables. For example, two hybrid cables 100A and 100B each similar (or identical) to hybrid cable 100 may couple systems S10 and S20 as shown in FIG. 15. Adapters 510 and 511 may be mounted on the chassis of system S10 and adapters 512 and 513 may be mounted on the chassis of system S20. Hybrid cable 100A couples to adapters 510 and 512. Hybrid cable 100B couples to adapters 511 and 513.

Adapter 510 couples to optical transmitter OTX1 and electrical device ED1 through Y-cable 501. Adapter 511 couples to optical receiver ORX1 and electrical device ED1 through Y-cable 502. Adapter 512 couples to optical receiver ORX2 and electrical device ED2 through Y-cable 503. Adapter 513 couples to optical transmitter OTX2 and electrical device ED2 through Y-cable 504. Y-cables 501–504 are each similar (or identical) to Y-cable 400 described above.

Optical transmitter OTX1 may transmit optical signals to optical receiver ORX2 through the optical connection which includes hybrid cable 100A, and optical transmitter OTX2 may transmit optical signals to optical receiver ORX1 through the optical connection which includes hybrid cable 100B. Electrical devices ED1 and ED2 are connected through two electrical connections, one mediated by hybrid cable 100A and the other by hybrid cable 100B. Electrical device ED1 may transfer electrical power and/or information signals to electrical device ED2, or vice versa, through the two electrical connections.

Altogether, there are eight couplings between cables and adapters (two couplings at each of the adapters 510–513). When a person decouples any of these eight couplings, it is important to shut off (or cut down) any light sources in system S10 and S20 because light emitted from the free end of a cable or adapter could damage the person's eyes. The same safety issue exists for accidental decoupling at any of the eight couplings or accidental severance of either (or both) of the hybrid cables. Electrical device ED1 may be configured to detect a break in the electrical circuit formed from the six cables (i.e. the four Y-cables and the two hybrid cables). When a break in the electrical circuit is detected, electrical device ED1 may shut off (or cut down) the light source for optical transmitter OTX1. Similarly, electrical device ED2 may be configured to detect a break in this same electrical circuit, and may shut off (or cut down) the light source for optical transmitter OTX2 in response to detecting the circuit breakage. This function of electrical device ED2 is referred to herein as the safety control function.

Electrical device ED1 (electrical device ED2) may be configured to sense a change in some electrical quantity associated with the electrical circuit such as voltage, current flow, impedance, capacitance or charge to detect the breaking of the circuit (i.e. a physical discontinuity in the circuit path).

In one embodiment, electrical device ED1 is configured both to supply power to electrical device ED2 and to perform the safety control function.

Figure 16:
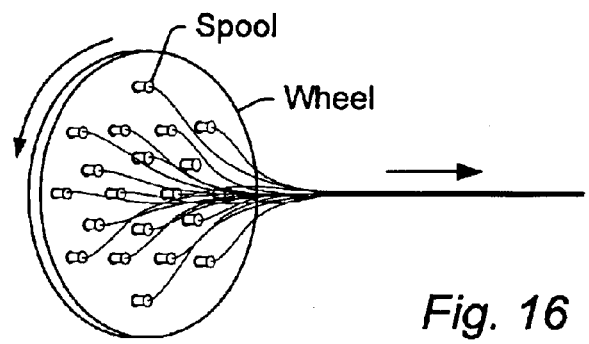
FIG. 16 illustates one embodiment of a method for manufacturing a hybrid cable.

Hybrid cable 100 may be manufactured by arranging a large number of spools on a wheel as suggested by FIG. 16. The spools are spools of the yarn material or spools of the metallic thread. A buffered optical fiber is pulled through the center of the wheel while the wheel turns slowly (e.g. one rotation per foot of optical fiber). The spooled materials are pulled off their respective spools and wrap around the optical fiber. The yarn-metal assembly thus formed may be passed through a jacketing system such as a thermoplastic (e.g. polyvinyl chloride) extrusion die.

Spools of metal may more densely populate the region towards the center of the wheel than spools of yarn material. Any of various distributions of spools of metal and spools of yarn are contempalted. For the sake of diagrammatical simplicity, the number of spools depicted in FIG. 16 is much smaller than what is used in practice.

For convenience of use, it is desirable that the connectors on both ends of the hybrid cable conform to some industry standard for fiber optic connectors. Examples of standard connectors include ST, FC, SMA, D4, Din, Biconic, Mini-BNC and SC connectors.

As described above, the collection of metallic strands in hybrid cable 100 form one electrical conductor. More generally, a hybrid cable may include one or more electrical conductors and one or more optical fibers. Two systems coupled together by the hybrid cable may communicate information through the one or more optical fibers, and transfer power and/or communicate additional information through the one or more electrical conductors.

Hybrid Cable with Two or More Simplex Units

Figure 17:
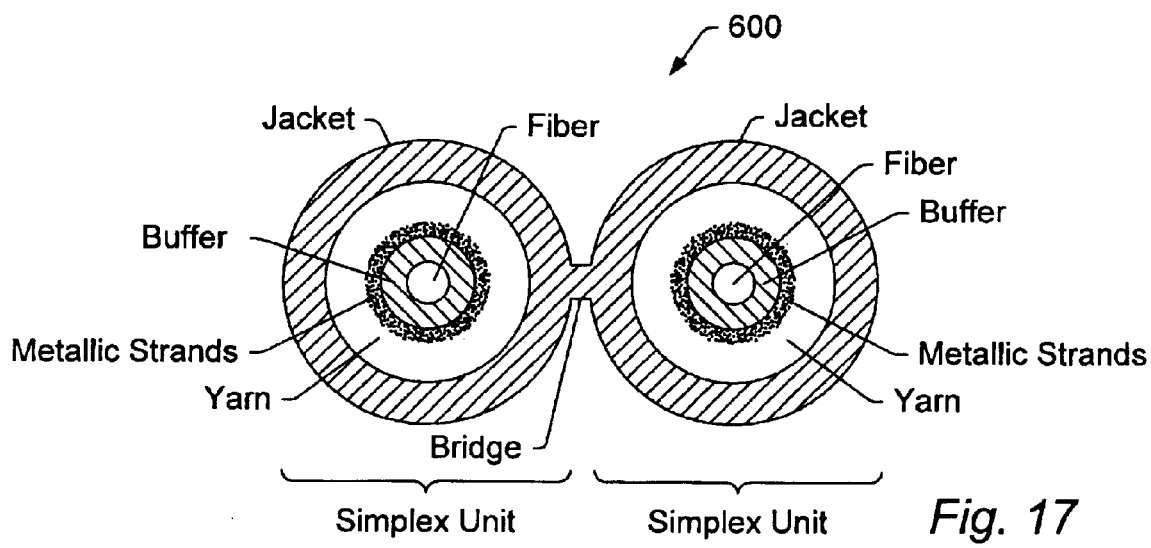
FIGS. 17 and 18 illustrate one embodiment of a duplex cable 600 containing two fibers and two electrical paths.
Figure 18:
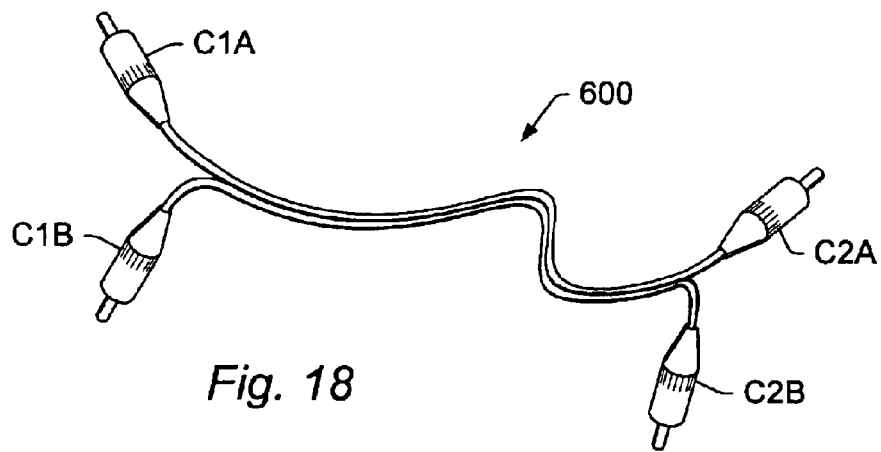

In one embodiment, a hybrid cable 600 may be configured with two optical fibers and two electrical conductors as suggested by FIG. 17. Hybrid cable 600 comprises two "simplex" units joined in a zipcord format. Each simplex unit has a structure similar to hybrid cable 100. The jackets of the two simplex and the narrow bridge between them form a zip-cord jacket. Because the bridge is narrow, the two simplex units may be peeled apart an appropriate distance so that each simplex unit may be separately terminated with a corresponding fiber-optic connector as suggested by FIG. 18. The first simplex unit may be terminated with connectors C1A and C2A, and the second simplex unit may be terminated with connectors C1B and C2B. Hybrid cable 600 may substitute for two instances of hybrid cable 100. For example, hybrid cable 600 may substitute for the pair of hybrid cables 100A and 100B shown in FIG. 15. In one set of embodiments, the zip-cord jacket is ultra-violet stabilized (for outdoor use) and/or plenum rated. Thus, the hybrid cable 600 may be installed without conduit if desired.

Similar methods may be employed to fabricate a hybrid cable having N simplex units, where N is a positive integer. Each simplex unit may have its own individual jacket. An outer jacket may surround the bundle of N simplex units. In one alternative embodiment, a hybrid cable may configured with one optical fiber and two electrical conductors. The two electrical conductors are insulated from each other. The hybrid cable has end connectors that support one fiber optic connection and two electrical connections.

Binocular Transceiver System

Figure 19:
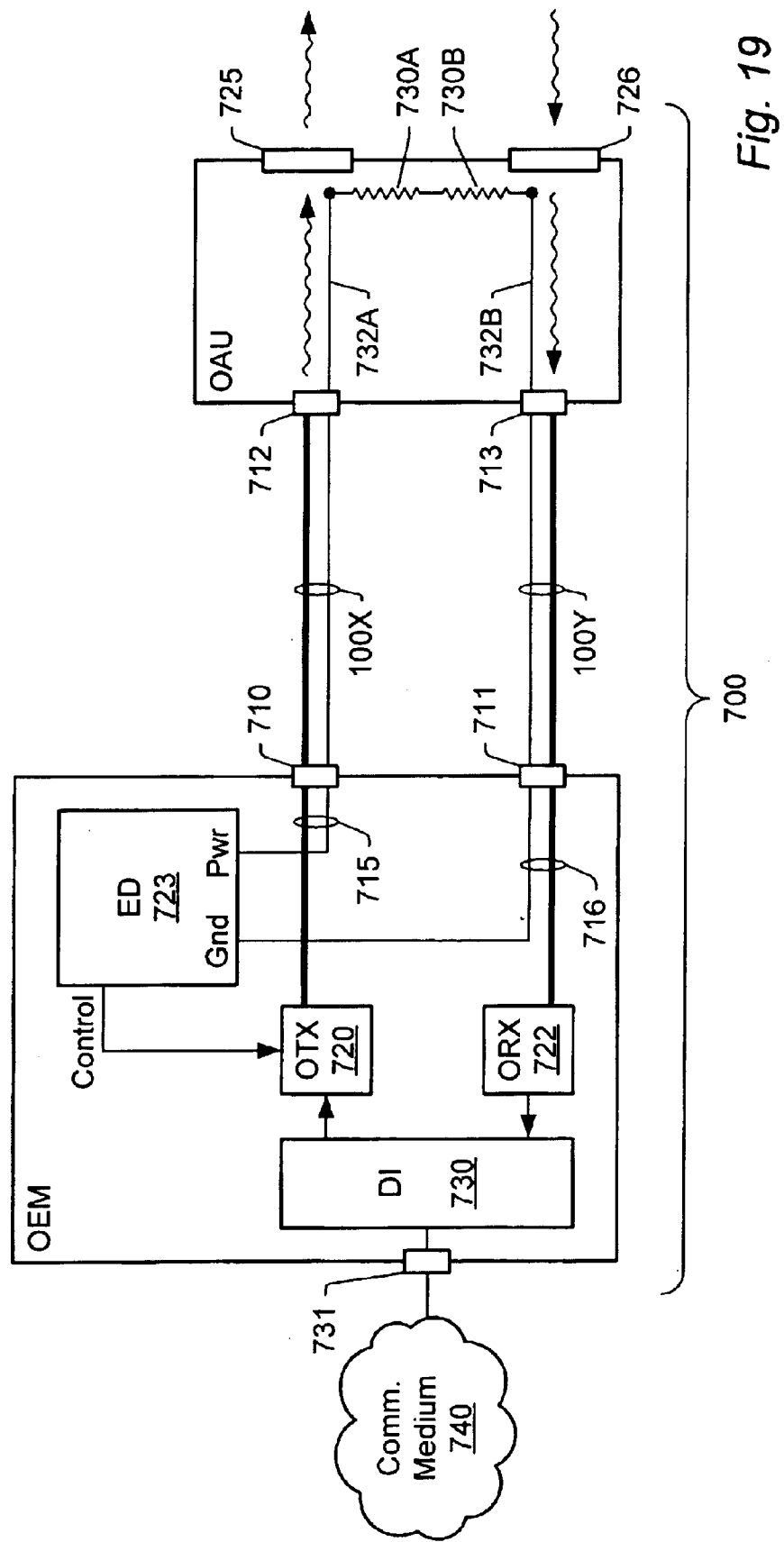
FIG. 19 illustrates one embodiment of a binocular transceiver system 700 for the wireless transfer of information through free space using beams of light energy.

In one set of embodiments, the present invention comprises a binocular transceiver system 700 for the wireless transfer of information through free space using beams of light energy as illustrated in the block diagram of FIG. 19. The transceiver system 700 comprises an optoelectronics module (OEM) and an optical antenna unit (OAU). The optoelectronics module OEM couples to the optical antenna unit OAU through two hybrid cables 100X and 100Y. Hybrid cables 100X and 100Y are similar (or identical) to hybrid cable 100 described above. (Hybrid cable 600 may substitute for hybrid cables 100X and 100Y.) For the sake of simplicity, hybrid cable 100X (hybrid cable 100Y) is briefly represented by two lines, one electrical line and one fiber optic line. See the description of FIGS. 1–8 above for more information on the construction and use of hybrid cable 100X (hybrid cable 100Y).

Optoelectronics module OEM comprises an optical transmitter 720, an optical receiver 722 and an electronic device 723. Adapters 710 and 711 may be configured similarly (or identically) to adapter 300. Adapters 710 and 711 may be mounted on a supporting structure (e.g. on the chassis) of the optoelectronics module OEM. Y-cable 715 couples the interior end of adapter 710 to optical transmitter 720 and electronic device 723. Y-cable 716 couples the interior end of adapter 711 to optical receiver 722 and electronic device 723. Y-cables 715 and 716 may be configured similarly (or identically) to Y-cable 400. The electrical wires of the Y-cables couple to electronic device 723. The optical fibers of the Y-cables couple to the optical transmitter 720 and the optical receiver 722 as shown.

Optical antenna unit OAU comprises adapters 712 and 713, transmit lens 725, receive lens 726, resistive heaters 730A and 730B. Hybrid cable 100X couples to the outside ends of adapter 710 and adapter 712, and hybrid cable 100Y couples to the outside ends of adapter 711 and adapter 713.

Optical transmitter 720 transmits an information-bearing optical signal (i.e. light beam) onto the optical fiber of Y-cable 715. The optical signal passes through this optical fiber to adapter 715 where it is coupled onto the optical fiber of hybrid cable 100X, and thence to the adapter 712. The optical signal emerges from the end of a conductive ferrule (i.e. part of the connector terminating hybrid cable 100X) which is coupled into adapter 712, and propagates through the intervening space to transmit lens 725 and through transmit lens 725 into free space (i.e. generally the atmosphere), and propagates through free space to one or more corresponding devices.

Conversely, another information-bearing optical signal (a receive signal) passes from free space through receive lens 726 and through the intervening space to adapter 713. The receive lens 726 focuses the optical signal onto a fiber aperture (i.e. fiber channel) of a ferrule which is coupled into adapter 713 and which is part of the connector terminating hybrid cable 100Y. Thus, the optical signal propagates through the optical fiber of hybrid cable 100Y to adapter 711 where it is coupled onto the optical fiber of Y-cable 716, and thence to optical receiver 722.

The electronic device 723 couples to one end of heater 730A through the electrical wire of Y-cable 715, the conductive alignment sleeve of adapter 710, the electrical conductor of hybrid cable 100X, and the electrical wire 732A internal to optical antenna unit OAU. Similarly, the electronic device 723 couples to one end of heater 730B through the electrical wire of Y-cable 716, the conductive alignment sleeve of adapter 711, the electrical conductor of hybrid cable 100Y, and the electrical wire 732B internal to the optical antenna unit OAU. The heaters 732A and 732B may be coupled in series. (It is noted that wires 732A and 732B are not necessarily separate wires which must be coupled to the heaters 730A and 730 as wires 732A and 732B may be lead wires for heaters 730A and 730B.)

The electronic device 723 may be configured to supply power to the heaters 732A and 732B through the series of electrical connections just described. A power terminal on the electronic device 723 may couple to the electrical wire of Y-cable 715, and a ground terminal of the electronic device 723 may couple to the electrical wire of Y-cable 716. (The coupling of terminals to electrical wires may be reversed as resistive heating elements don't care which way the current flows.)

The electronic device 723 may also be configured to detect an electrical discontinuity (i.e. an open loop condition) in the external circuit, i.e. in the circuit path extending out from the power terminal, through the heaters, and back to the ground terminal. In response to detecting the open loop condition, electronic device 723 may turn off (or cut down the emitted power of) the optical transmitter 720. For example, electronic device 723 may assert (or deassert) a control signal which switches off (or cuts down the emitted power of) a source laser (or radiating element) of the optical transmitter 720. The electronic device may detect a change in an electrical quantity such as current to determine when the open loop condition occurs.

As described above, the transceiver system 700 transmits an information-bearing light beam through lens 725 into the atmosphere. The light beam propagates through the atmosphere to one or more communicating devices. Because the beam spreads, the intensity of the light beam decreases with increasing distance from the optical antenna unit OAU. Furthermore, atmospheric phenomena such as humidity, rain, snow, hail and fog also attenuate the transmitted light beam. In order to maintain a sufficient signal power at a receiving device, the light source (e.g. a laser) of optical transmitter 720 would normally have an output power level that is not eye-safe. Thus, the safety control function performed by electronic device 723 satisfies a significant need.

FIG. 19 illustrates heaters 730A and 730B as being coupled in series. In one alternative embodiment, heaters 730A and 730B are coupled in parallel. In this alternative embodiment, a first end of each heater couples to adapter 712 through electrical wire, and a second end of each heater couples to adapter 713 through electrical wire.

Figure 20:
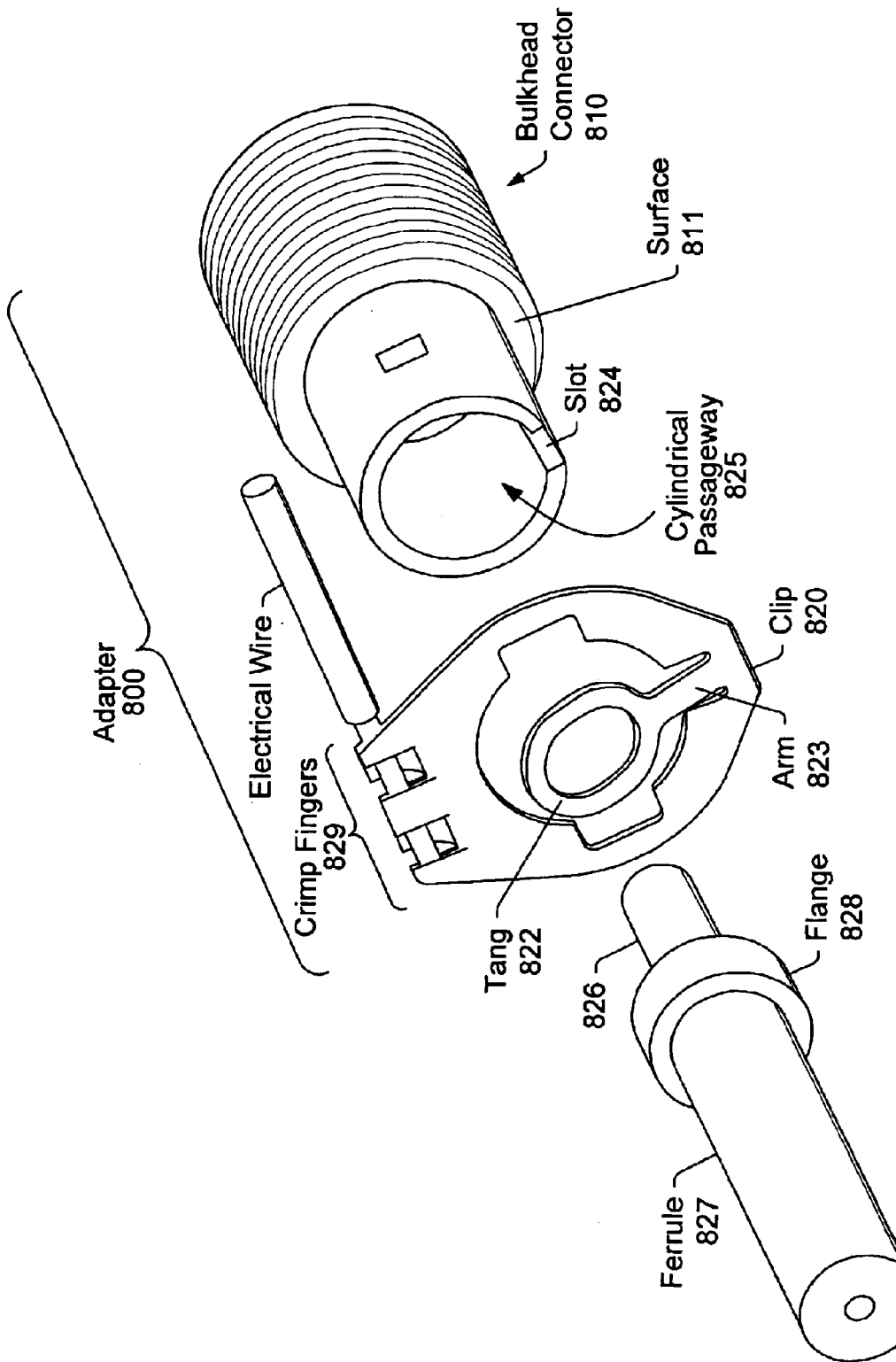
FIG. 20 illustrates one embodiment of an adapter 800 suited for mounting at the focal plane of a optical antenna cone.

Adapter 712 and adapter 713 may be similar (or identical) to adapter 800 shown in FIG. 20. Adapter 800 comprises a bulkhead connector 810 and a clip 820. Bulkhead connector 810 has one end that is threaded and one end that is configured for coupling to a connector which terminates hybrid cable 100X or hybrid cable 100Y. The former end will be referred to as the threaded end, and the later will be referred to as the exterior end (as it is available from the outside of optical antenna unit OAU). In one embodiment, the exterior end is configured in the style of a ST bulkhead connector. In other embodiments, the second end is configured in the style of various other connector types. In one alternative embodiment, the exterior end is also threaded.

Figure 21:
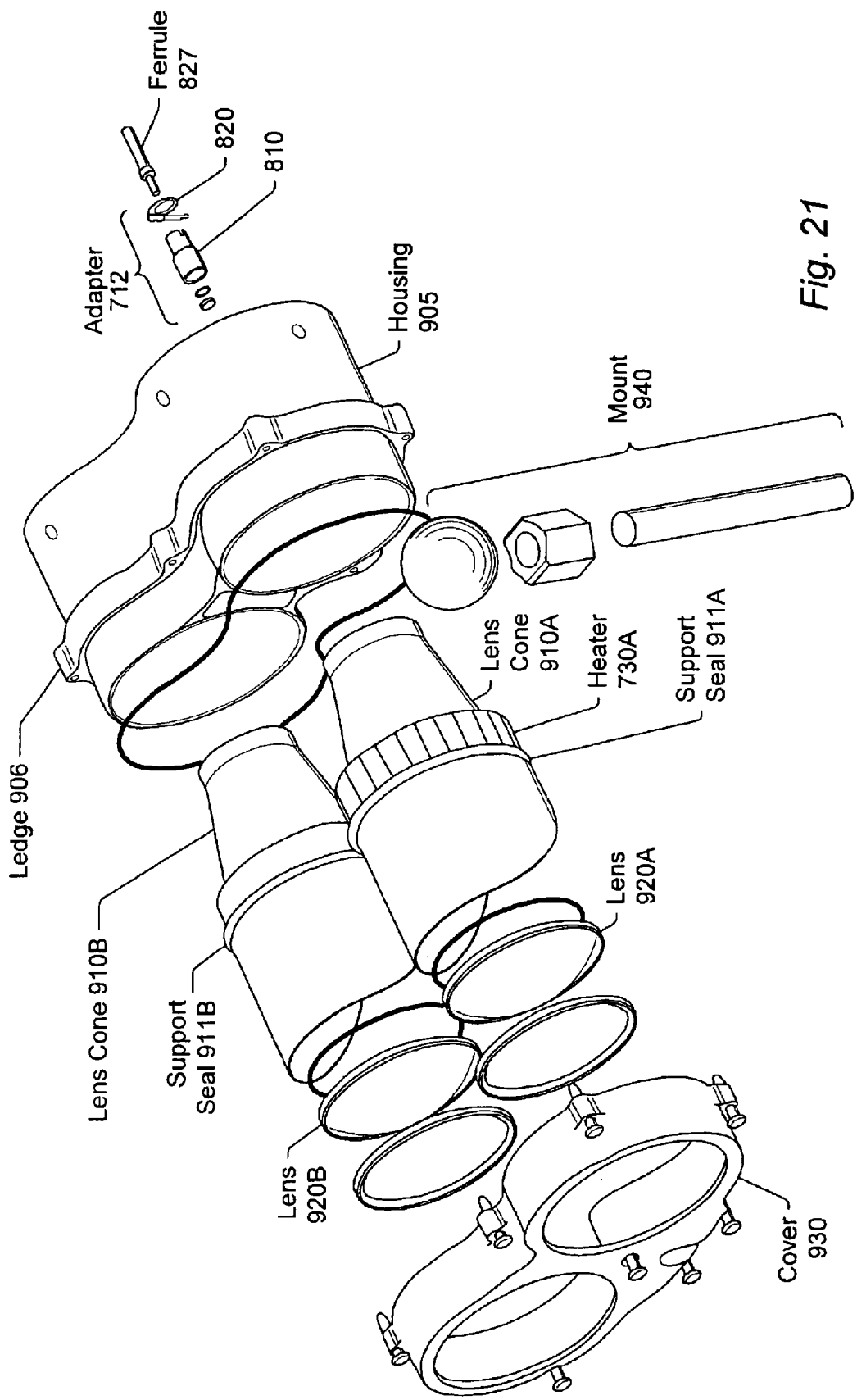
FIG. 21 illustrates one embodiment of an binocular optical antenna unit for transmitting and receive light signals to/from the atmosphere.

The threaded end may be screwed into a threaded hole in a supporting structure of the optical antenna unit OAU. The threaded end faces toward one of the lenses (i.e. one of transmit lens 725 or receive lens 726) as illustrated in FIG. 21. Bulkhead connector 810 may be made of an electrically nonconductive substance such as plastic.

To support an electrical connection, a spring-loaded clip 820 is made of an electrically conductive material (e.g. a metal or metal alloy such as brass). Clip 820 is configured to slip over the exterior end of bulkhead connector 810. One of the heater wires 732A or 732B may be soldered (or otherwise coupled) to clip 820. Clip 820 has a small spring-loaded tang 822 with an oval hole in it. A supporting arm 823 of the tang fits within an alignment slot 824 of the exterior end. The tang is centered on the axis of the bulkhead connector 810, and is small enough to fit within cylindrical passageway 825 of the exterior end of the bulkhead connector 810.

The term "spring loaded" is used herein to describe elements that are configured to exert a resistive force upon compression and is not limited in its descriptive power to helical springs. (For example, tang 822 is spring loaded due to the nominal deformation of its supporting arm 823 from the central plane of clip 820.)

The inner perimeter of the tang is large enough to admit the electrically conductive end portion 826 of an electrically conductive ferrule 826. The conductive ferrule 826 may terminate a hybrid cable (e.g. any one of the hybrid cable embodiments described above). When the clip is in place around the exterior end of the bulkhead connector, the conductive ferrule 826 may be inserted in the passageway 825 of the bulkhead connector 810 and locked into position with a coupling nut 203 as shown in FIG. 9 (or with any other locking mechanism) so that the clip 820 is trapped between flange 828 and a surface 811 of bulkhead connector 810. (A coupling nut is not repeated here in FIG. 20 for the sake of simplicity.) In the locked position, the tang is deformed from its nominal position. This deformation induces a force of contact between tang 822 and an end surface of flange 828. Because the clip 820 (including the tang) and the ferrule 827 are electrical conductive, the contact force induces an electrical contact between the clip 820 and the ferrule 827.

Clip 820 may have some small crimp fingers 829 on its edge. The crimp fingers hold an electrical wire (e.g. one of heater wires 732A or 732B) for one or more electrical devices in place on the clip during soldering.

One embodiment of optical antenna unit OAU is shown in FIG. 21. The optical antenna unit OAU comprises adapters 712 and 713 (which are configured similarly or identically to adapter 800), a housing 905, two lens cones 910A and 910B, two lenses 920A and 920B, and a housing cover 930. The lens cones 910 fit into the housing 905. The support seals 911 of the lens cones are sandwiched between cover 930 and the ledge 906 of housing 905.

Each lens cone may have a resistive heater (e.g. resistive heating tape) wrapped around its exterior surface (or some portion of its exterior surface). Heater 730A wraps around lens cone 910A. Heater 730B wraps around lens cone 910B. The heaters keep the lenses 920 warm enough so that dew or frost does not accumulate on the lenses 920 or any other optical apertures of optical antenna unit OAU. (Dew or frost accumulating on an optical aperture may attenuate the optical signal passing through that aperture. Thus, it is important to prevent or inhibit their accumulation on optical apertures.)

Electrical wire 732A couples the conductive clip of adapter 712 to heater 730A. Electrical wire 732B couples the conductive clip of adapter 713 to heater 730B. (Heater 730B is not shown in FIG. 21 in order to more clearly illustrate what the surface of a lens cone may look like underneath one of the heaters). The two remaining wires of heaters 730A and 730B are electrically coupled to each other within the antenna housing. This places the two heaters in series.

As mentioned above, in an alternative embodiment, heaters 730A and 730B may be coupled in parallel. In this alternative embodiment, a first end of each heater may couple to the conductive clip of adapter 712 by electrical wire, and a second end of each heater may couple to the conductive clip of adapter 713 by electrical wire. Thus, each conductive clip may be configured for coupling to two electrical wires. It is to be understood that various embodiments of optical antenna units are contemplated where heaters are configured in parallel, in series, or in more complex circuit structures.

It is desirable to construct housing 905, lens cones 910, cover 930 and/or mount 940 from a durable and light substance such as aluminum. It should be noted that these metallic parts are electrically insulated from the heater circuit (referred to above as the external circuit) because the nonconductive bulkhead connectors 910 in adapters 712 and 713 intervene between the conductive clips 820 and the corresponding lens cones. This electrical isolation prevents the heater circuit from being accidentally short-circuited.

Adapter 712 is shown at the far right in an exploded view which anticipates its coupling to ferrule 827. As described above, ferrule 827 may terminate a hybrid cable and lock into adapter 712 with the aid of a coupling nut (or some other locking mechanism). It would be advantageous for the end face of the ferrule 827, in its locked position, to be at the focal plane of lens 920A. (In FIG. 20, the end face of ferrule 827 is the face which faces tang 822. See also FIG. 9 item 202G for the illustration of such an end face.) The threaded end of the bulkhead connector 810 may be threaded into a hole at the end of the lens cone, and turned until the end face of ferrule 827 lies in the focal plane of lens 920A. When performing this threading adjustment, it may be advantageous to use a temporary fiber optic cable connected into bulkhead connector 810 instead of the hybrid cable and ferrule 827. After this adjustment has been made, the bulkhead connector 810 may be fixed in its position relative to lens cone 910A with epoxy (or some other fixing mechanism).

The optoelectronics module OEM may further comprise a data interface 730 and a connector 731. Connector 731 is configured for coupling to a communication medium 740. Data interface 730 is configured for sending and receiving data through the communication medium 730. The communication medium 730 may be any communication medium of interest and/or use to potential customers such as Ethernet, ATM, FDDI, etc.

Data interface 730 may receive data (e.g. a data stream) from the communication medium 740 through connector 731, and forward the data to optical transmitter 720. Optical transmitter 720 modulates the data onto an optical signal (e.g. a laser beam) resulting in a modulated optical signal. This modulated optical signal is the information-bearing optical signal referred to above which the optical transmitter 720 transmits onto the outgoing optical path starting with the optical fiber of Y-cable 715.

Furthermore, as described above, optical receiver 722 receives a second information-bearing optical signal (having been transmitted from a corresponding device through the atmosphere) from the optical fiber of Y-cable 716. Optical receiver 722 demodulates data from the second optical signal and sends the data to data interface 730. Data interface 730 forwards the data to some destination through communication medium 740. Thus, data interface 730 is configured to send and receive data according to any protocols that may prevail on communication medium 740.

The hybrid cables 100X and 100Y (or hybrid cable 600) intervening between optoelectronics module OEM and optical antenna unit OAU implies that a user (or system configuration personnel) may position the optoelectronics module OEM at a first location that is most convenient for the optoelectronics module and may independently position the optical antenna unit OAU at a second location which is most convenient for the optical antenna unit OAU. The optical antenna unit OAU may need to achieve an optical line-of-sight to a communicating device. This typically implies that optical antenna unit OAU will be situated at an elevated outdoor location (e.g. on the roof of a building). The optoelectronics module OEM may need environmental control (e.g. temperature control), access to an electrical power source (e.g. a wall outlet), access to a communication medium (e.g. an Ethernet network) and/or access to a host computer. These needs typically imply that optoelectronics module OEM will be situated internal to a building. In one typical scenario, the optoelectronics module OEM is situated inside a user's home and the optical antenna unit is mounted on his/her roof. In another typical scenario, the optoelectronics module may be situated inside an office building and the optical antenna unit OAU may be mounted on the roof of the office building.

It is a general fact that any electrical conductor has an electrical resistance which is an increasing function of its length. As described above, the collection of conductive strands in hybrid cable 100 form an electrical conductor. This electrical conductor serves to deliver power and/or current between two devices (such as optoelectronics module OEM and optical antenna unit OAU). Since the power output capacity of any electrical device sourcing the electrical conductor is limited, the requirement for effective delivery of power and/or transport of current may impose an upper bound on the length of hybrid cable 100. However, this upper bound is sufficiently large to accommodate the connection between the optoelectronics module OEM and the optical antenna unit OAU in many of the most typical choices for the first location and the second location. For example, a hybrid cable 300 meters in length has been used in a system prototype.

The heating elements in the optical antenna unit OAU need electrical power. In some embodiments, the optical antenna unit OAU may have other uses for electrical power. For example, the optical antenna unit may include an active alignment system, a data logging device, and/or, one or more sensors. Hybrid cables 100X and 100Y (or hybrid cable 600) deliver electrical power from the optoelectronics module OEM to the optical antenna unit OAU through their electrical conductors.

Monocular Transceiver System

Figure 22:
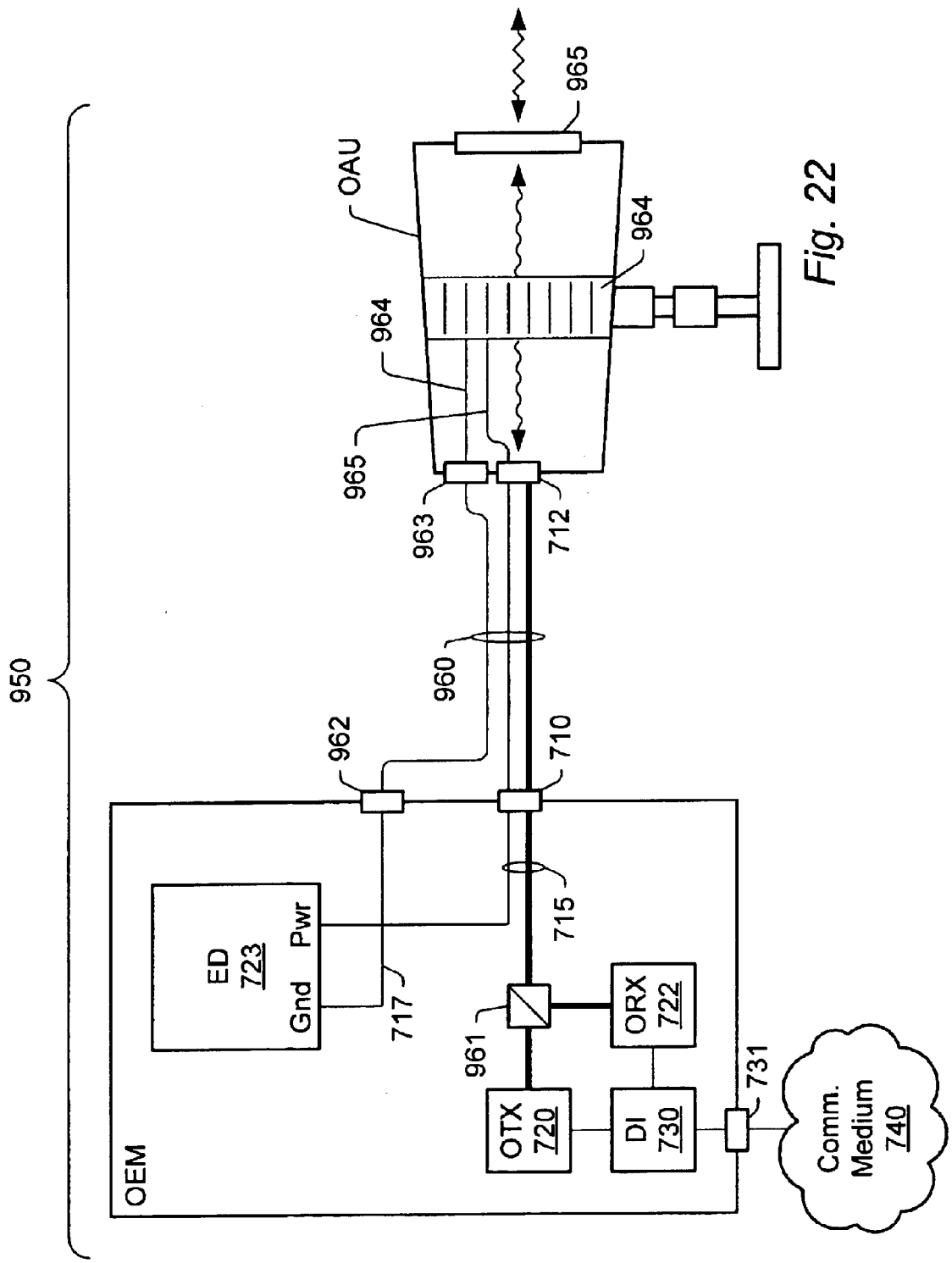
FIG. 22 illustrates one embodiment of a monocular transceiver system 950.

In one set of embodiments, a monocular transceiver system 950 may be configured as illustrated as suggested in FIG. 22. Many of the elements of this system are identical (or similar) in function to corresponding elements of the communication system of FIG. 19, and thus, are given common item numbers. The optoelectronics module OEM may be configured to transmit and receive information-bearing optical signals (i.e. light beams) through one optical fiber path. Thus, the optical antenna unit OAU is monocular, i.e. has only one lens cone (or more generally, one lens and the corresponding containing structure for housing the lens). This one lens cone serves as both a transmit and receive cone.

The optoelectronics module OEM and the optical antenna unit OAU are connected by a hybrid cable 960 which provides one optical fiber and at least one electrically conductive connection. The transmit and receive light beams may simultaneously propagate through the single optical fiber of the hybrid cable 960 in opposite directions. The transmit and receive light beams may have distinct wavelengths or polarizations so the receive light beam may be separated from the shared optical path inside the optoelectronics module.

The optoelectronics module may include a beam separator 961 (e.g. a dichroic mirror or polarization separator). The transmit light beam generated by optical transmitter 720 passes through beam separator 961 onto the optical fiber of Y-cable 715 in the outward direction, through adapter 710 and onto the optical fiber of hybrid cable 960, through adapter 712, through the internal space of the optical antenna unit OAU, and through lens 965 into the atmosphere. The receive light beam passes in the reverse direction except that when it reaches beam splitter 961 it is redirected to optical receiver 722. In this fashion, the optical transmitter 720 may transmit while the optical receiver 722 simultaneously receives through the shared optical path.

In one embodiment, a bandpass optical filter intervenes between the beam separator 961 and the optical receiver 722. The bandpass optical filter is tuned to pass a narrow band of wavelengths around the receive wavelength, and thus, prevents cross talk between the transmit wavelength and the receive wavelength.

In one alternative embodiment, the optical transmitter 720 and optical receiver 722 share the single optical path in a time-multiplexed fashion.

Figure 23:
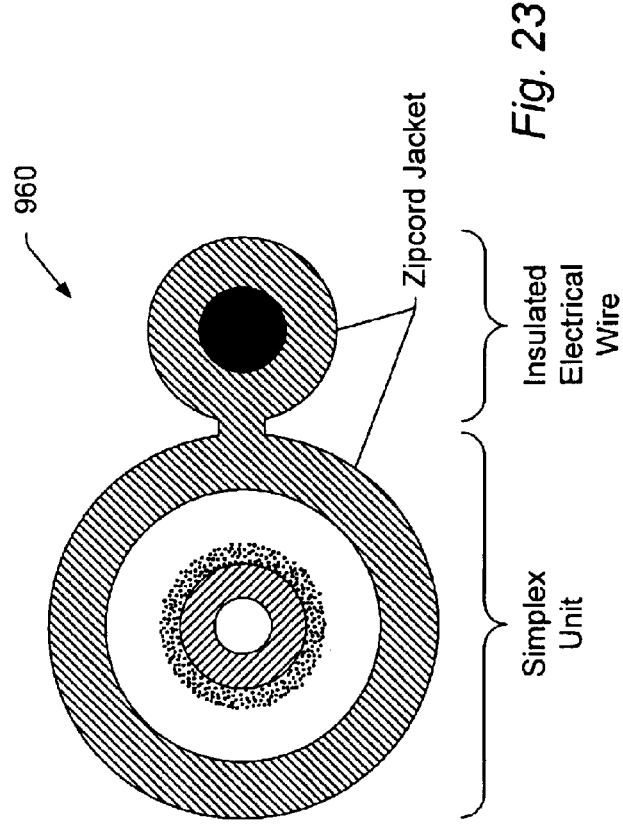
FIG. 23 illustrates one embodiment of a "unequally yoked" hybrid cable where one simplex unit partners with a typical insulated metal wire.

To support the safety control function and power delivery function (performed by electronic device 723, two electrically conductive connections are needed between the optoelectronics module and the optical antenna unit. In one embodiment, the two electrically conductive connections are provided by hybrid cable 960 as shown in FIG. 23. Hybrid cable 960 comprises one simplex unit (as described above) and one insulated electrical wire bound in a zipcord jacket. At both ends, the simplex unit and insulated electrical wire may be peeled apart and separately terminated. Thus, one electrically conductive connection is provided through the simplex unit and the second through the electrical wire. Bulkhead connectors 962 and 963 may be provided on the chassis on the optoelectronics module OEM and optical antenna unit OAU respectively for coupling to the terminated electrical wire. Electrical leads 964 and 965 may couple heater tape 964 (or other heating element) to bulkhead connector 963 and adapter 712.

In a second embodiment, hybrid cable 960 is replaced by hybrid cable 100 and a separate insulated electrical wire. The two electrically conductive connections are provided by conductive strands in hybrid cable 100 and the separate insulated electrical wire.

In a third embodiment, hybrid cable 960 is replaced with hybrid cable 600. The two simplex units in hybrid cable 600 each contribute one electrically conductive connection. The optical fiber in one simplex unit carries the bi-directional light traffic while the optical fiber in the other simplex unit may be unused. Equivalently, two of hybrid cable 100 may substitute for hybrid cable 600.

In another set of embodiments, an optoelectronics module may be configured as a transmit-only device. Thus, the optical receiver 722 may be omitted from optoelectronics module OEM, and the optical antenna unit OAU may be configured with only one lens cone. At least one hybrid cable couples the optoelectronics module and optical antenna unit to provide a fiber optic path for the transmit light beam. As with the bi-directional transceiver embodiments described above, a variety of connectivity options are available for providing the two electrical connections in support of the safety control function and power delivery function.

In yet another set of embodiments, an optoelectronics module may be configured as a receive-only device. Thus, the optical transmitter 720 may be omitted from optoelectronics module OEM, and the optical antenna unit OAU may be configured with only one lens cone. At least one hybrid cable couples the optoelectronics module and optical antenna unit to provide a fiber optic path for the received light beam. As with the bi-directional transceiver embodiments described above, a variety of connectivity options are available for providing the two electrical connections in support of the safety control function and/or the power delivery function. This comment about the variety of available connectivity options to support electrically-related functions holds for many of the embodiments discussed below.

In one embodiment, the optoelectronics module may be configured as a repeater 1005. Thus, the optoelectronics module OEM may comprise two optical transmitters, two optical receivers, and two electronic devices and the data interface 730 may be omitted. The optoelectronics module OEM connects to two optical antenna units through hybrid cables. Each optical antenna unit may be independently oriented so as to have access to a different set of correspondents. Optical transmitter A sends and optical receiver A receives optical signals (i.e. light energy) through the first optical antenna unit. Optical transmitter B sends and optical receiver B receives optical signals (i.e. light energy) through the second optical antenna unit. Data recovered by optical receiver A is forwarded to optical transmitter B for modulation onto an optical signal to be sent out the second optical antenna unit. Likewise, data recovered by optical receiver B is forwarded to optical transmitter A for modulation onto an optical signal to be sent out the first optical antenna unit. The optical antenna units may be binocular devices (having two lens cones) as suggested by FIG. 21.

Alternatively, each optical antenna unit may be a monocular device (having one lens and the corresponding containment structure). Thus, each monocular antenna unit both receives and transmits light energy. Optical transmitter A sends and optical receiver A receives light beam energy along one optical path (i.e. the optical fiber in the hybrid cable that couples to the first monocular antenna unit). Similarly, optical transmitter B sends and optical receiver B receives light beam energy along a second optical path (i.e. the optical fiber in the hybrid cable that couples to the second monocular antenna unit). Thus, the optoelectronics module may include beam separation devices (e.g. dichroic mirrors or polarization separators) to facilitate the bi-directional along each optical path. The first electronic device may deliver power and/or provide the safety control function for the first optical antenna unit, and the second electronic device may deliver power and/or provide the safety control function for the second optical antenna unit.

The optical antenna unit of the monocular transceiver unit 950 is described as having one lens cone. Similarly, the optical antenna unit of the binocular transceiver unit 700 is described as having two lens cones. As suggested by FIG. 21, a lens cone is a structure for holding an optical lens and an adapter (such as adapter 810) in fixed relation to one another. Use of the term "lens cone" herein is not meant to exclude other shapes or geometries for this lens housing structure.

Point-to-Point Transceiver Link

Figure 24:
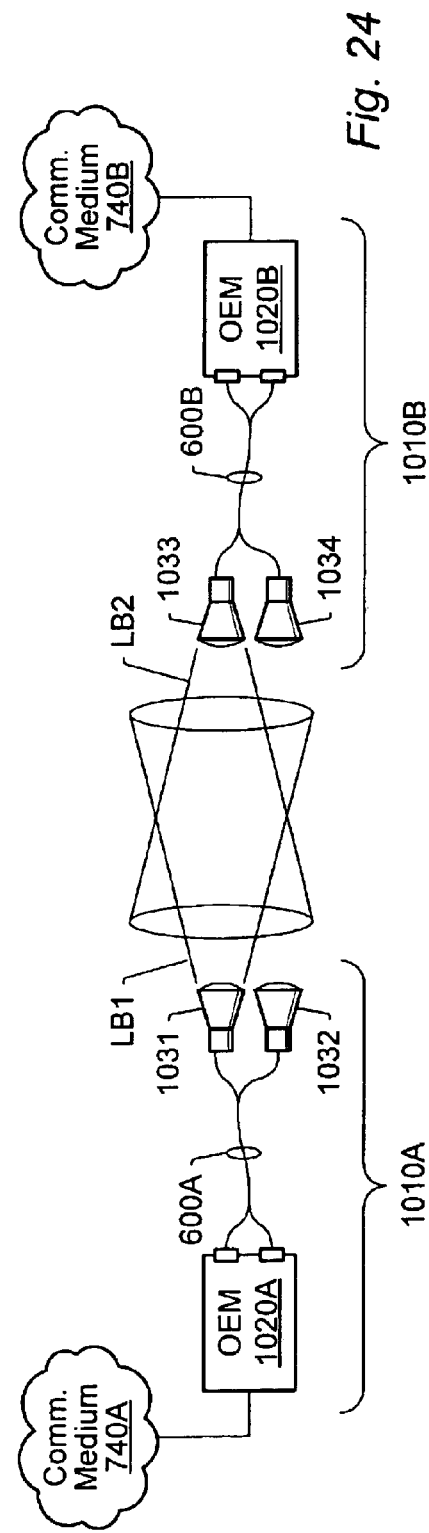
FIG. 24 illustrates one embodiment of a point-to-point communication link between two transceiver systems.

FIG. 24 illustrates one embodiment of a point-to-point communication link between two transceiver systems 1010A and 1010B. Each of transceiver systems 1010A and 1010B may be configured similarly (or identically) to binocular transceiver system 700. Transceiver system 1010A comprises an optoelectronics module 1020A, a transmit antenna 1031 and a receive antenna 1032. The optoelectronics module 1020A may couple to the antenna 1031 and 1032 through a hybrid cable 600A. Similarly, transceiver system 1010B comprises an optoelectronics module 1020B, a transmit antenna 1033 and a receive antenna 1034. The optoelectronics module 1020B may couple to the antenna 1033 and 1034 through a hybrid cable 600B. Hybrid cables 600A and 600B may be configured similarly (or identically) to hybrid cable 600. Communication medium 740A represents any possible source and/or sink of data. Similarly, communication medium 740B represents any possible source and/or sink of data.

Optoelectronics module 1020A receives data from communication medium 740A and modulates the data onto a first light beam, and sends the modulated light beam out through hybrid cable 600A to transmit antenna 1031. Transmit antenna 1031 sends the modulated light beam LB1 through the atmosphere to the receive antenna 1034. The transmit antenna 1031 will have been adjusted so as to point towards receive antenna 1034. Receive antenna 1034 receives a portion of the modulated light beam and sends the received portion to optoelectronics module 1020B through hybrid cable 600B. Optoelectronics module 1020B demodulates the data from the modulated light beam and sends the data to communication medium 740B. The point-to-point link operates similarly in the reverse direction. Thus, bi-directional data communication between communication media 740A and 740B is supported by the point-to-point link. It is noted that one or more repeaters may intervene between the two transceivers 1010A and 1010B if a line-of-sight does not exist between the two buildings. In one typical scenario, communication media 740A and 740B represent two computers (or computer networks) in two respective office buildings.

In one alternative embodiment, the point-to-point link may be implemented with one binocular transceiver unit 1010 and one monocular transceiver system 950.

In another alternative embodiment, the point-to-point link may be implemented with two instances of monocular transceiver unit 950, i.e. one instance at each end of the link.

In one set of embodiments, the optoelectronics module OEM of binocular transceiver system 700 (monocular transceiver system 950) is configured as a printed circuit board for insertion into a slot (e.g. a PCI, ISA, or USB bus slot) of a host computer such as a desktop computer. This configuration may be especially attractive to home and business users. One or more hybrid cables extend from the optoelectronics module board to the outdoor optical antenna unit. A network interface card (e.g. an Ethernet card) already coupled to the host computer may serve as the data source/sink for the optoelectronics module board. The optoelectronics module board may connect to the network interface card (NIC) through a interconnect cable such as CAT 5 cable. Alternatively, the functionality of a network interface card may be incorporated in the optoelectronics module board.

In a similar embodiment, the optoelectronics module of binocular transceiver system 700 (monocular transceiver system 950) is configured as a separate chassis (i.e. box) which couples to the host computer or the network interface card of the host computer. The chassis may be situated a location conveniently accessible to the host computer, while the optical antenna unit may be situated at some location that has optical visibility to the free-space optical correspondent. One or more hybrid cables couple the optoelectronics module and the optical antenna unit.

In some embodiments, the optoelectronics module may be configured to couple to a communication port of the host computer. For example, the optoelectronics module may be configured to couple to an Industry Standard Architecture (ISA) port, an Extended Industry Standard Architecture (EISA) port, a Peripheral Component Interconnect (PCI) port, an IEEE 1394 port, or a Universal Serial Bus (USB) port, or any combination thereof.

Point-to-Multipoint Transceiver Link

Figure 25:
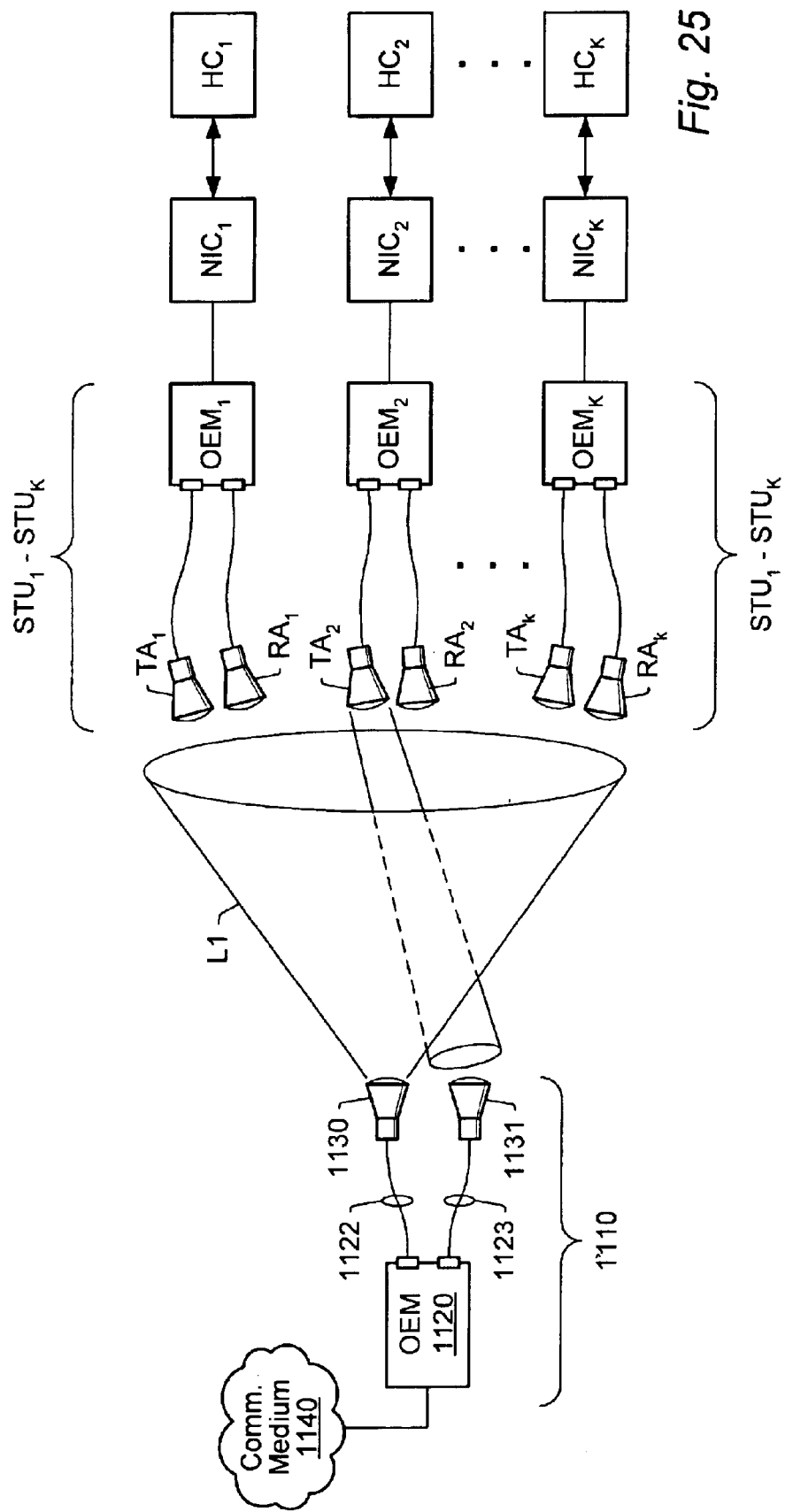
FIG. 25 illustrates one set of embodiments of a point-to-multipoint communication link.

FIG. 25 illustrates one set of embodiments of a point-to-multipoint communication link. The point-to-multipoint link comprises a binocular point-to-multipoint transceiver 1110 and subscriber transceiver units $STU_1$, $STU_2$, ..., $STU_K$. Some of subscriber transceiver units may be similar (or identical) to binocular transceiver 700 while others may be similar (or identical) to monocular transceiver 950. FIG. 25 illustrates the case where all the subscriber transceiver units are binocular transceivers. Thus, each subscriber transceiver unit $STU_J$ comprises an optoelectronics module $OEM_J$ which couples to a transmit antenna $TA_J$ and receive antenna $RA_J$ through one or more hybrid cables.

Binocular transceiver 1110 comprises an optoelectronics module 1120 coupled to a transmit antenna 1130 and a receive antenna 1131 through one or more hybrid cables. Binocular transceiver 1110 receives a data stream from communication medium 1140 (e.g. an Ethernet switch), modulates the data stream onto a light beam $L_1$, and delivers the modulated light beam $L_1$ to transmit antenna 1130 through a hybrid cable 1122. Transmit antenna 1130 transmits the modulated light beam $L_1$ through the atmosphere to the subscriber transceiver units. The optical parameters of transmit antenna 1130 are configured so that light beam $L_1$ simultaneously covers the receive antennas $RA_1$, $RA_2$, ..., $RA_K$ of the subscriber transceiver units.

FIG. 25 does not mean to suggest that subscriber transceiver units or their antennas must be co-located or clustered in an array. Generally, the receive antennas $RA_1$, $RA_2$, ..., $RA_K$ are situated at different locations. In one typical scenario, the subscriber transceiver units are associated with a group of residences in a neighborhood. Each subscribing residence may have one of the subscriber transceiver units. The optoelectronics module $OEM_J$ is located conveniently inside the residence. The transmit antenna $TA_J$ and receive antenna $RA_J$ are mounted outside the residence (e.g. on the roof or balcony, or on a mast). The indoor optoelectronics module $OEM_J$ couples to the outside antennas $TA_J$ and $RA_J$ through one or more fiber optic cables (e.g. hybrid cables). Hybrid cables are preferable as they support the safety control function and the delivery of power to the antenna for lens heating (or for any of various other reasons).

The receive antenna $RA_J$ of each subscriber transceiver unit $STU_J$ intercepts a portion of the energy of light beam $L_1$ and delivers the received portion to the corresponding optoelectronics module $OEM_J$. Optoelectronics module $OEM_J$ demodulates the data stream from the received beam portion, and provides the data stream to a corresponding network interface card $NIC_J$. The network interface card $NIC_J$ may examine the addresses of packets in the data stream and extract those packets having the address of network interface card $NIC_J$. The extracted packets may be forwarded to a corresponding host computer $HC_J$. Note that the index J is meant to indicate an arbitrary one of the values 1, 2, ..., K.

Light beam L1 subtends a solid angle SA1 that is determined by the optical parameters of the transmit antenna 1130. Light beam L1 also has a maximum effective range MER1, i.e. a maximum range at which a subscriber transceiver unit is able to effectively receive and demodulate the data carried by light beam L1. For a given radiated power of the light beam L1, the maximum effective range MER1 decreases as the solid angle SA1 increases. Multiple configurations of optoelectronics module 1120 may have correspondingly different values for the radiated power of light beam L1, and multiple configurations for the transmit antenna TA1 may have correspondingly different values for the solid angle SA1. This allows a system installer (or service provider) the flexibility to choose system components to accommodate a given spatial distribution of subscribers. In one embodiment, the transmit antenna 1130 may have adjustable optics so that the solid angle SA1 may be varied continuously through a range of values.

In the reverse direction, host computer $HC_J$ may generate data packets and pass these data packets to the corresponding network interface card $NIC_J$. The network interface card $NIC_J$ passes the data packets to the corresponding optoelectronics module $OEM_J$. The optoelectronics module $OEM_J$ modulates the data packets on a return beam $RB_J$ and delivers the return beam $RB_J$ to transmit antenna $TA_J$. Transmit antenna $TA_J$ transmits the return beam $RB_J$ through the atmosphere to receive antenna 1131.

Receive antenna 1131 receives an composite beam which is an additive combination of the return beams $RB_1$, $RB_2$, ..., $RM_K$ as it is possible though perhaps unlikely for all the optoelectronics modules $OEM_1$, $OEM_2$, ..., $OEM_K$ to simultaneously transmit. The network interface cards $NIC_1$, $NIC_2$, ..., $NIC_K$ may implement the Ethernet CSMA/CD (Carrier Sense Multiple Access with Collision Detection) protocol of listening for silence before initiating transmission, and terminating transmission upon collision detection with random wait for retry. Optoelectronics module 1120 may support the CSMA/CD protocol by retransmitting to the subscriber transceiver units any data it receives on the composite beam. Thus, the network interface cards $NIC_1$, $NIC_2$, ..., $NIC_K$ have the illusion that they are connected to an ordinary wired network.

The transmit antennas $TA_1$, $TA_2$, ..., $TA_K$ of the subscriber transceiver units are pointed at the receive antenna 1131. Because these transmit antennas need only illuminate receive antenna 1131, they may be more narrowly focused than transmit antenna 1130 which simultaneously illuminates all the receive antennas $RA_1$, $RA_2$, ..., $RA_K$.

Receive antenna 1131 intercepts the composite return beam and delivers the composite return beam to the optoelectronics module 1120 through a hybrid cable 1123. Optoelectronics module 1120 detects the composite return beam to generate a received data stream, and supplies the received data stream to the communication medium 1140. As noted above, the received data stream may also be retransmitted, i.e. modulated onto the light beam L1 and sent to the subscriber transceiver units through transmit antenna 1130.

In one alternative embodiment, the optoelectronics modules $OEM_1$, $OEM_2$, ..., $OEM_K$ generate their respective return beams $RB_1$, $RB_2$, ..., $RB_K$ with distinct wavelengths. Again, the receive antenna 1131 receives a composite beam which is an additive combination of the return beams, and delivers the composite beam to the optoelectronics module 1120. However, in this embodiment, the optoelectronics module 1120 includes a wavelength separation unit (e.g. a diffraction grating) that separates each of the return beams to a corresponding detector. Each detector recovers a corresponding data stream from the corresponding return beam. The data streams are forwarded to communication medium 1140. Note that the subscriber transceiver units $STU_1$, $STU_2, \ldots, STU_K$ may all transmit simultaneously as each has a dedicated wavelength channel. In this embodiment, the optoelectronics module 1120 may omit the circuitry for retransmitting data received from the subscribers because the subscribers are not competing for the same resource. The same observation applies to several of the following embodiments.

In another alternative embodiment, the optoelectronics modules $OEM_1, OEM_2, \ldots, OEM_K$ generate their respective return beams $RB_1, RB_2, \ldots, RB_K$ with distinct polarizations. In this case, the optoelectronics module 1120 includes a polarization separation unit that separates each of the return beams based on their distinct polarizations. Note that the subscriber transceiver units $STU_1, STU_2, \ldots, STU_K$ may all transmit simultaneously as each has a dedicated polarization channel.

In yet another embodiment, the optoelectronics modules $OEM_1, OEM_2, \ldots, OEM_K$ generate their respective return beams $RB_1, RB_2, \ldots, RB_K$ with distinct pairs ($\lambda$, $\theta$) of wavelength $\lambda$ and polarization angle $\theta$.

In yet another alternative embodiment, the optoelectronics modules $OEM_1, OEM_2, \ldots, OEM_K$ may transmit in distinct timeslots according to some TDMA (time division multiple access) protocol.

The maximum number $K_{max}$ of subscriber transceiver units supported by a given transceiver unit 1110 is an integer greater than or equal to two.

The one or more hybrid cables connecting optoelectronics module 1120 to transmit antenna 1130 and receive antenna 1131 may be used to support a safety control loop and the delivery of power to transmit and receive antennas (for lens heating, etc.).

Figure 26:
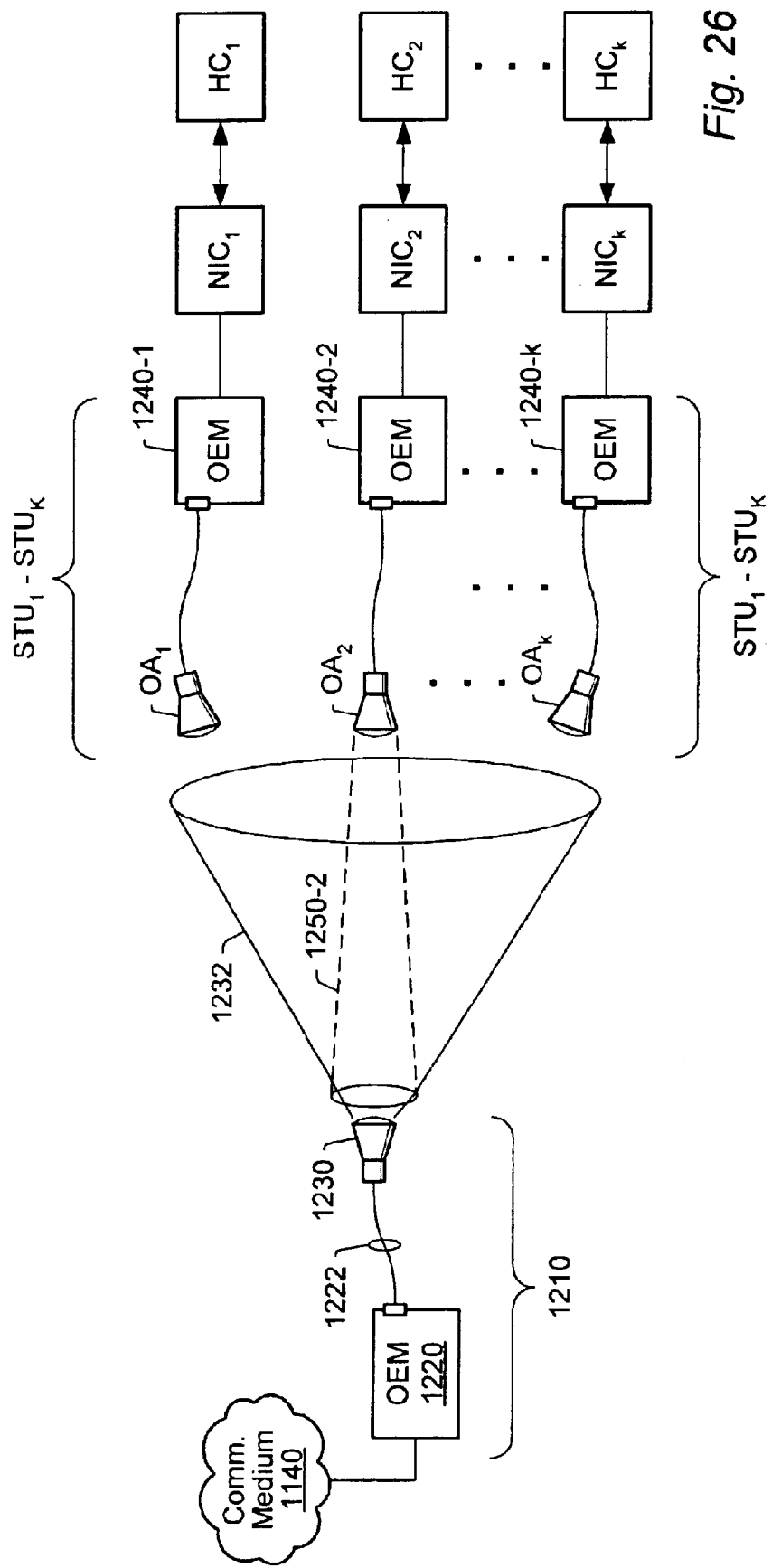
FIG. 26 illustrates another set of embodiments of the point-to-multipoint communication link.

FIG. 26 illustrates another embodiment of the point-to-multipoint communication link. In this embodiment, the communication link comprises a point-to-multipoint transceiver 1210 and subscriber transceiver units $STU_1$, $STU_2, \ldots, STU_K$. Point-to-multipoint transceiver 1210 is a monocular transceiver. (As used herein the term "monocular transceiver" denotes a transceiver that transmits and receives through a single optical pathway.) Some of subscriber transceiver units may be similar (or identical) to binocular transceiver 700 while others may be similar (or identical) to monocular transceiver 950. FIG. 26 illustrates the case where all the subscriber transceiver units are monocular transceivers. Thus, each subscriber transceiver unit $STU_J$ comprises an optoelectronics module 1240-J which couples to an optical antenna $OA_J$ through one or more hybrid cables.

Monocular transceiver 1210 comprises an optoelectronics module 1220 coupled to an optical antenna unit 1230 through one or more hybrid cables. Optoelectronics module 1220 receives a data stream from communication medium 1140 (e.g. an Ethernet switch), modulates the data stream onto a light beam 1232, and delivers the modulated light beam 1232 to optical antenna unit 1230 through a hybrid cable 1222. Optical antenna unit 1230 transmits the modulated light beam 1232 through the atmosphere to the subscriber transceiver units. The light beam 1232 simultaneously illuminates the optical antennas $OA_1, OA_2, \ldots, OA_K$ of the subscriber transceiver units.

The optical antenna $OA_J$ of each subscriber transceiver unit $STU_J$ intercepts a portion of the energy of light beam 1232 and delivers the received portion to the corresponding optoelectronics module 1240-J. Optoelectronics module 1240-J demodulates the data stream from the received beam portion, and provides the data stream to the corresponding network interface card $NIC_J$. The network interface card $NIC_J$ may examine the addresses of packets in the data stream and extract those packets having the address of network interface card $NIC_J$. The extracted packets may be forwarded to the corresponding host computer $HC_J$.

In the reverse direction, host computer $HC_J$ may generate data packets and pass these data packets to the corresponding network interface card $NIC_J$. The network interface card $NIC_J$ passes the data packets to the corresponding optoelectronics module 1240-J. The optoelectronics module 1240-J modulates the data packets on a return beam 1250-J and delivers the return beam 1250-J to optical antenna $OA_J$. Optical antenna $OA_J$ transmits the return beam 1240-J through the atmosphere to optical antenna 1230.

Optical antenna 1230 receives a composite beam which is a linear combination of the return beams 1250-1, 1250-2, ..., 1250-K as it is possible though perhaps unlikely for all the optoelectronics modules 1240-1, 1240-2, ..., 1240-K to simultaneously transmit. The network interface cards $NIC_1, NIC_2, \ldots, NIC_K$ may implement the Ethernet CSMA/CD (Carrier Sense Multiple Access with Collision Detection) protocol of listening for silence before initiating transmission, and terminating transmission upon collision detection with random wait for retry. Optoelectronics module 1220 may support the CSMA/CD protocol by retransmitting to the subscriber transceiver units any data it receives on the composite beam.

Optical antenna 1230 intercepts the composite return beam and delivers the composite return beam to the optoelectronics module 1220 through the hybrid cable 1222. Optoelectronics module 1220 detects the composite return beam to generate a received data stream, and supplies the received data stream to the communication medium 1140. As noted above, the received data stream may also be retransmitted, i.e. modulated onto the light beam 1240 and sent to the subscriber transceiver units through the atmosphere.

In one alternative embodiment, the optoelectronics modules 1240-1, 1240-2, ..., 1240-K generate their respective return beams 1250-1, 1250-2, ..., 1250-K with distinct wavelengths. Thus, the optoelectronics module 1220 includes a wavelength separation unit (e.g. a diffraction grating) that separates each of the return beams to a corresponding detector. In this embodiment, the optoelectronics module 1120 may omit the circuitry for retransmitting data received from the subscribers because the subscribers are not competing for the same resource. This observation holds for several of the following embodiments.

In another embodiment, the optoelectronics modules 1240-1, 1240-2, ..., 1240-K generate their respective return beams 1250-1, 1250-2, ..., 1250-K with distinct polarizations. In this case, the optoelectronics module 1220 includes a polarization separation unit that separates each of the return beams to a corresponding detector based on their distinct polarizations.

In yet another embodiment, the optoelectronics modules 1240-1, 1240-2, ..., 1240-K generate their respective return beams 1250-1, 1250-2, ..., 1250-K with distinct pairs ($\lambda$, $\theta$) of wavelength $\lambda$ and polarization angle $\theta$.

In yet another alternative embodiment, the optoelectronics modules 1240-1, 1240-2, ..., 1240-K may transmit in distinct timeslots according to some TDMA (time division multiple access) protocol or with distinct digital codes such as with code division multiple access (CDMA).

Optical Network

Figure 27:
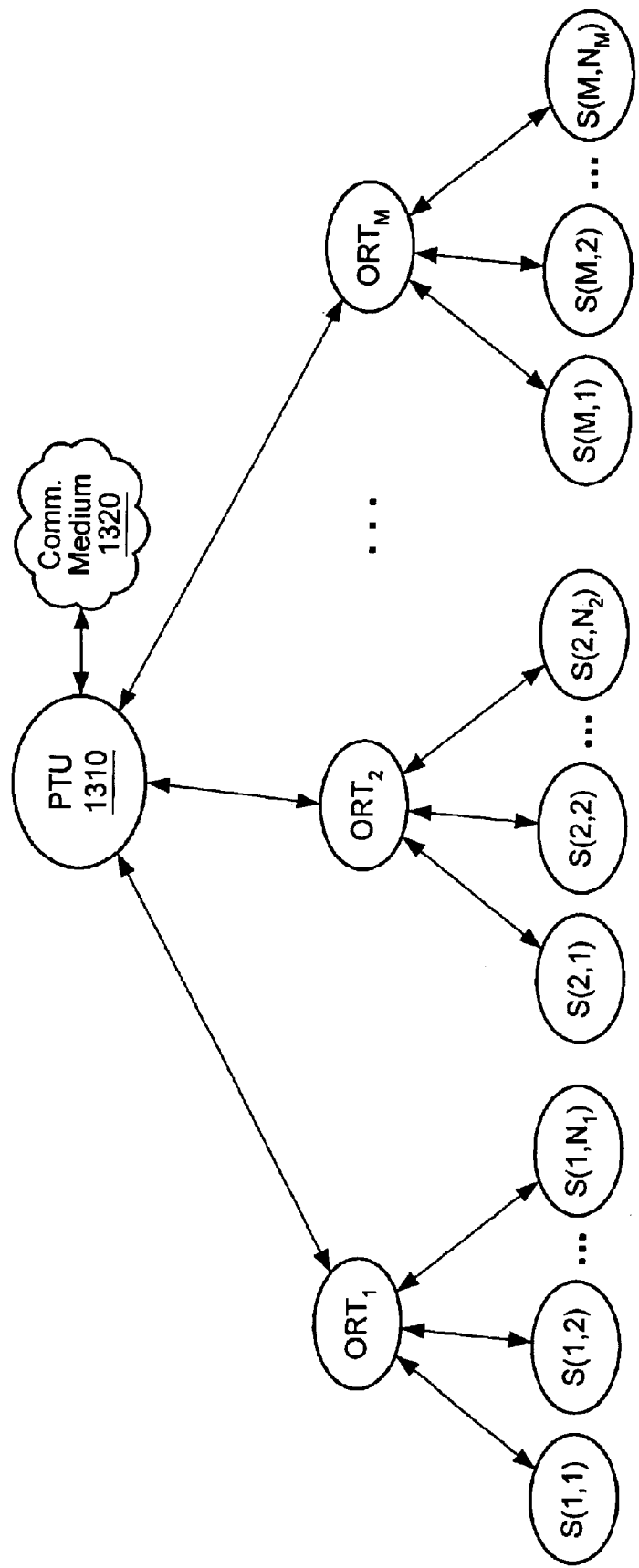
FIG. 27 illustrates one embodiment of an optical communication network.

The present invention also comprises an optical communication network of which one embodiment is illustrated in FIG. 27. FIG. 27 illustrates a hierarchical structure in which a primary transceiver unit 1310 communicates bi-directionally with M optical routers. Each of the M optical routers communicates bi-directionally with a corresponding set of subscriber units (also referred to as client units). Each of the subscriber units exchanges data with a corresponding data device (e.g. a television, a videoconferencing system, a host computer or computer network). In particular, each optical router $ORT_k$ communicates with $N_k$ subscriber units, where k is between 1 and M inclusive. The numbers M and $N_1, N_2, \ldots, N_M$ are positive integers. The notation S(k,j) indicates the $j^{th}$ subscriber unit of optical router $ORT_k$. The optical router $ORT_k$ communicates bi-directionally with each of the subscribers units S(k,1), S(k,2), ..., S(k,$N_k$).

The primary transceiver unit 1310 and the optical routers communicate by means of light beams transmitted through the atmosphere. Likewise, the optical routers and the subscriber units communicate by means of light beams transmitted through the atmosphere. The subscriber units may be systems similar (or identical) to any of the embodiments of binocular transceiver system 700 and/or monocular transceiver system 950 described above.

The primary transceiver unit 1310 may communicate bi-directionally with a communication medium 1320. Communication medium 1320 represents any medium or media that subscribers may desire to communicate with. For example, communication medium 1050 may be a computer network such as the Internet.

The optical communication network may include other primary transceiver units in addition to primary transceiver unit 1310. Each primary transceiver unit communicates with its own set of optical routers and set of subscriber units through that set of optical routers. The primary transceiver units may communicate bi-directionally with each other according to any of a variety of network topologies. The primary transceiver units may communicate with each other through any of various means including the atmospheric transmission of light beams.

Figure 28:
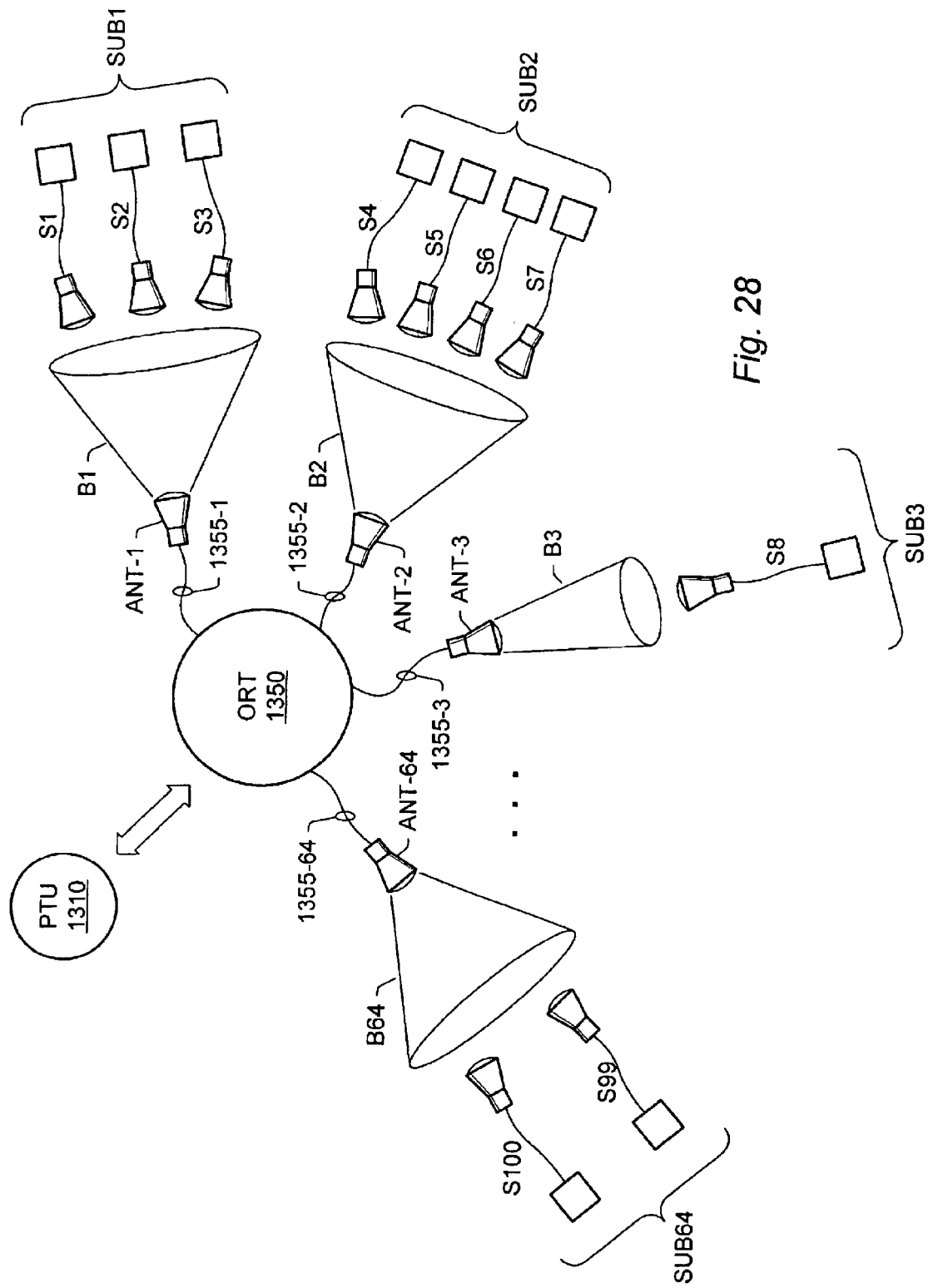
FIG. 28 illustrates one embodiment of an optical router 1350 and its interaction with subscriber units.

FIG. 28 illustrates one embodiment of an optical router 1350 and its interaction with subscriber units. The optical router 1350 communicates bi-directionally with multiple subsets of subscriber units in point-to-point fashion or point-to-multipoint fashion. The generic $I^{th}$ subset of subscriber units is denoted $SUB_I$. Primary transceiver unit 1310 may send data destined for one or more of the subscriber units of subset $SUB_I$ to the optical router 1350 through a free-space optical connection. Optical router 1350 modulates the data onto a light beam $B_I$ and transmits the light beam $B_I$ through the atmosphere to the subscriber units of subset $SUB_I$ using a corresponding fiber cable 1355-I and a corresponding optical antenna ANT-I. The subscriber units of subset $SUB_I$ detect the data from the light beam $B_I$ and send the data (or respective portions of the data) to corresponding data devices (e.g. host computers, computer networks, televisions and/or videoconferencing systems). In the reverse direction, the subscriber units of subset $SUB_I$ receive corresponding data packets from the data devices and transmit light beams carrying the corresponding data packets through the atmosphere to optical antenna ANT-I and thence to the optical router 1350 through fiber cable 1355-I. The optical router 1350 may demodulate the subscriber data packets and forward the subscriber data packets to their respective destinations (e.g. up the hierarchy to primary transceiver unit 1310 or back down the hierarchy to subscriber units) based on their respective destination addresses.

Optical router 1350 may simultaneously perform bi-directional communication with two or more of the multiple subsets $SUB_1, SUB_2, \ldots, SUB_{64}$.

It is noted that fiber cables 1355-1, 1355-2, ..., 1355-64 are preferably realized by hybrid cables (i.e. any of the various hybrid cable embodiments disclosed herein or combinations thereof). Hybrid cables allow the optical router to conveniently deliver power (e.g. for lens heating) and provide eye safety control with respect to the optical antennas ANT-1, ANT-2, ..., ANT-64.

FIG. 28 illustrates an optical router with 64 optical antennas in communication with 100 subscribers. These numbers are exemplary and not limiting. The present invention contemplates various configurations for the optical router where the number $N_{ant}$ of optical antennas and the number of subscribers supported by the optical router attain any desired values, e.g. any values users and/or service providers might be interested in having.

For the sake of diagrammatic simplicity, FIG. 28 presents the case where all the subscriber transceiver units are monocular transceivers and where the optical router operates bi-directionally through each of its antennas. However, any or all of the monocular transceivers may be substituted with binocular transceivers, and the optical router may operate binocularly (i.e. transmit and receive through separate fibers with correspondingly separate antennas) with any or all of the subscriber subsets $SUB_I$.

Optical router 1350 may implement time division multiple access (TDMA) or code division multiple access (CDMA) techniques to create distinct data channels for the distinct subscriber units within each subset $SUB_I$.

In one embodiment, optical router 1350 comprises one or more point-to-multipoint transceivers such as binocular transceiver 1120 and/or monocular transceiver 1220. Each point-to-multipoint transceiver may support one of the subscriber subsets.

Observe that optical router 1350 may communicate in point-to-point fashion with solo subsets such as subset SUB3 having only one subscriber unit. Thus, optical router 1350 may also include one or more point-to-point transceivers such as binocular transceiver 700 and/or monocular transceiver 950 to support point-to-point links with individual subscriber units.

Figure 29:
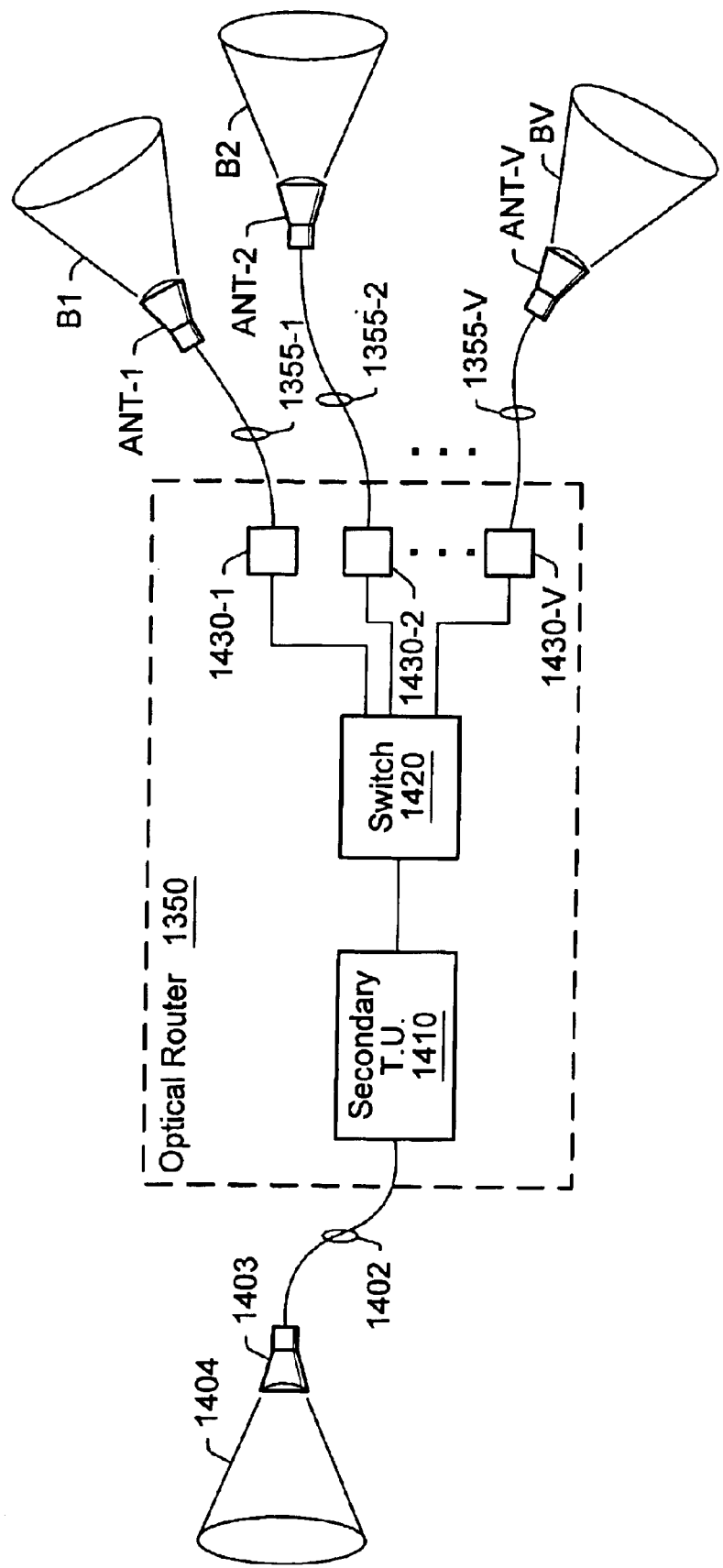
FIG. 29 illustrates one embodiment of optical router 1350.

FIG. 29 illustrates one embodiment of optical router 1350. Optical router 1350 comprises a plurality of transceivers 1430-1, 1430-2, ..., 1430-V, a data switch 1420, and a secondary transceiver unit 1410. Transceiver 1430-I communicates bi-directionally with the subscriber subset $SUB_I$ through corresponding fiber connection 1355-I and corresponding optical antenna ANT-I (or a corresponding set of optical antennas), wherein I takes any value in the range 1, 2, ..., V. The fiber connection 1355-I may include one or more hybrid cables (i.e. any of the hybrid cable embodiments described herein or combinations thereof).

Switch 1420 may a conventional data switch product (e.g. an off-the-shelf Ethernet switch). Switch 1420 couples to the plurality of transceivers 1430-1, 1430-2, ..., 1430-V and to the secondary transceiver unit 1410.

Secondary transceiver unit 1410 couples to an optical antenna 1403 (or set of optical antennas) through a fiber connection 1402 (or a plurality of fiber connections), and uses the optical antenna 1403 to communicate bi-directionally with the primary transceiver unit 1310 by means of the atmospheric transfer of light beams (e.g. laser beams). The fiber connection 1402 may comprise one or more hybrid cables as described herein. Optical antenna 1403 intercepts a light beam transmitted by the primary transceiver unit 1310, and forwards the light beam to the secondary transceiver unit 1410 through the fiber connection 1402. Secondary transceiver unit 1420 detects the subscriber data that has been modulated on the light beam by the primary transceiver unit 1310, and forwards the data to switch 1420. Switch 1420 forwards the subscriber data packets to one or more of the transceivers 1430-1, 1430-2, . . . , 1430-V (e.g. based on addressing information carried in the packets). Transceivers 1430-1, 1430-2, . . . , 1430-V send the subscriber data packets to corresponding subscribers or groups of subscribers by means of atmospherically transmitted light beams as described variously above.

In the reverse direction, the transceivers 1430-1, 1430-2, . . . , 1430-V receive light beams carrying return data packets from the subscribers in their corresponding groups as variously described above. The transceivers 1430-1, 1430-2, . . . , 1430-V demodulate the return data packets from the receive light beams and forward the return data packets to the switch 1420. Switch 1420 may forward the return data packets to secondary transceiver unit 1410, and secondary transceiver unit 1410 may transmit the return data packets to the primary transceiver unit through the fiber connection 1402, optical antenna 1403 and free space (e.g. the atmosphere). In addition, switch 1420 may send return data packets back down the hierarchy to one or more of transceivers 1430-1, 1430-2, . . . , 1430-V.

Figure 30:
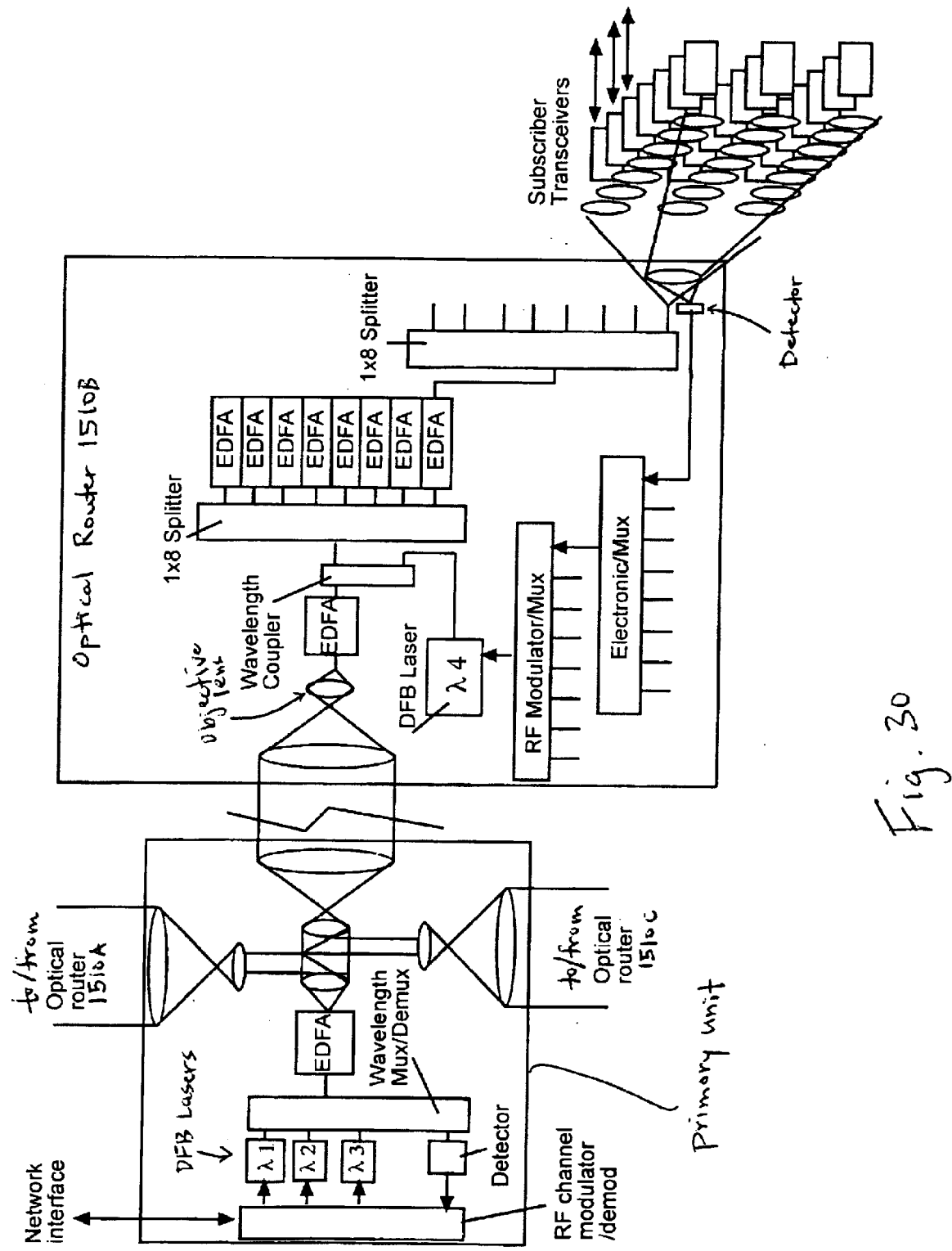
FIG. 30 illustrate one embodiment of all-optical distribution network.

FIG. 30 illustrates one embodiment of an all-optical FSO distribution network. A backbone service provider connection may drive a number of distributed feedback lasers (DBF lasers) at the primary unit. Each DFB laser may have a characteristic wavelength $\lambda_I$. The modulated laser signals may be multiplexed together and fed into an erbium-doped fiber amplifier (EDFA). The amplified laser signal may be transmitted via an afocal telescope to three FSO optical routers 1510A–C at three different cell sites. The separate wavelength components $\lambda_1$, $\lambda_2$ and $\lambda_3$ may be separated out from the amplified laser signal and sent to the respective optical routers. Thus, optical router 1510B may receive the modulated laser beam corresponding to wavelength $\lambda_2$. At each FSO router such as optical router 1510B, the signal may be collected using another afocal telescope which in turn may have an objective lens to couple the receive light into an optical fiber. The signal from the fiber may be amplified with an EDFA and then power split into 8 channels. Each of the 8 channels may be amplified again and power split another 8 times. At this point there are 64 channels. Each signal corresponding to each channel may be supplied to an optical antenna unit through a hybrid cable as described variously herein, and the optical antenna unit may transmit the channel signal through the atmosphere to a corresponding set of subscribers. For example, each channel may be configured to deliver power to up to four subscribers simultaneously. In this configuration, the optical router supports up to 256 (i.e. 64 times 4) subscribers. For the return path, each subscriber may be assigned a frequency and a detector may be built into each of the 64 channels to detect the return signals. The return signals may be multiplexed together to drive a DFB laser at the optical router 1510B. The resulting laser signal is transmitted to the primary unit through the afocal telescope. As an alternative approach for the return path, instead of RF frequency separation, digital coding techniques such as CDMA or TDMA may be used to accomplish channel separation. This may achieve the added benefit of coding gain. The field of view of each transmitted channel signal may cover 6 degrees in azimuth and 45 degrees in elevation.

The jagged line in the optical path between the primary unit and the optical router 1510B is meant to suggest an intervening extent of atmosphere or free-space.

It is noted that the numbers given in the above discussion of all-optical FSO distribution network are exemplary, and a wide variety of values are contemplated for each of the following numbers: the number of DFB lasers at the primary unit, the number of optical routers in communication with the primary unit, the number of initial channels generated by the first power splitting at the optical router, the number of final channels generated by the second power splitting at the optical router, the azimuth coverage angle and elevation coverage angle of each channel signal, etc.

Active Alignment

In one set of embodiments, the optical router's antenna units may be actively aligned to stabilize their respective beams on their respective sets of subscribers. The cost of deploying an actively-aligned antenna array on a cell tower is an increasing function of the size and weight of the antenna units and the number of antenna units in the array. Thus, it is desirable to minimize the size and weight of the antenna units. Reducing the size and weight of the antenna array structure is also an important aspect for building an FSO network over an existing PCS cell system.

As described variously above, the router's antenna units are separated from the active optoelectronics by hybrid cables. Thus, the router's antenna units have a smaller form factor and lighter weight than if the active optoelectronics were co-located with the antenna units.

Furthermore, monocular transceiver systems may be more desirable with regard to size and weight than binocular transceiver systems, as the monocular transceiver systems use a single lens cone to perform bi-directional communication while the binocular transceiver systems use two lens cones (one for transmit and one for receive). A monocular transceiver system has the added benefit that it may be intrinsically bore-sighted because the transmit and receive paths are the same.

Service Provisioning

All electronics for a tower system may remain in a cabinet or hut located at ground level. A mixture of transceiver units (e.g. any of the various optical transceiver embodiments described herein) may provide for expanded service offerings on an as-needed basis. Protocol, speed, and feature set enhancements may take place through remote management of the FSO router. If a customer were to first subscribe to wireless ESP services at 10 Mbps, then later require voice and video over ATM, the service installer dispatched to the customer premises may remotely request a different "beam" from the FSO router at the cell tower. The 10 Mbps Ethernet "beam" may be switched off, and a new 155 Mbps ATM "beam" may be switched on and directed to the subscriber. The installer of a subscriber antenna may initiate the process for establishing communication with the FSO router, then change-out the transceiver unit at the customer premises to complete the connection.

The FSO routers may be geographically distributed and mapped such that installer crews, through wireless access to the network management system, may locate the subscriber antennas using differential GPS and request service from the FSO router within line-of-sight. The FSO router may direct a transceiver antenna to illuminate the requesting subscriber. The installer crew may use the received signal to visually align the fiber-coupled subscriber antenna. The subscriber antenna system may or may not also have an active alignment system. Once the subscriber antenna has been aligned, the active tracking system of the FSO router can optimize on the transmit and receive power levels.

Fiber Coupling

The principle of separately packaging the active optoelectronics and the antenna optics of a freespace optical (FSO) system, and coupling the two packages with optical fiber is referred to herein as "fiber coupling". The active optoelectronics may include the optical and electronic elements required for (a) generating and modulating the transmit light beam and (b) demodulating the receive light beam. A number of systems implementing this principle are described in U.S. patent application Ser. No. 09/106,826 filed on Jun. 29, 1998 entitled "Wireless Fiber-Coupled Telecommunication Systems Based on Atmospheric Transmission of Laser Signals".

It is noted that a fiber-coupled FSO system may use conventional fiber optic cable to implement the coupling between the optoelectronics module and the optical antenna unit. However, a number of advantages may follow from using hybrid cable (i.e. any of the hybrid cable embodiments described above) instead of conventional fiber optic cable. Namely, the optoelectronics module may use the one or more electrical conductors provided by the hybrid cable(s) to deliver electrical power (e.g. for lens heating) to the optoelectronics module and/or to manage an eye-safety control system. The same comments apply to the optical router and its connections to the router optical antennas, and/or the primary transceiver unit and its optical antennas.

To establish an FSO communication link between two optical antennas, the optical antennas are adjusted so as to point towards each other. This adjustment is generally performed by a trained person at cost to the subscriber/user. A fiber-coupled FSO system allows a user to replace (or upgrade) his/her optoelectronics module without disturbing the alignment of the optical antenna unit. The user simply disconnects the hybrid cable from the optoelectronics module and reconnects the hybrid cable to the replacement module. The other end of the hybrid cable remains connected to the optical antenna unit. Thus, it is not necessary to realign the optical antenna unit at the time of replacement or upgrade to the optoelectronics module. The same is true for replacements and/or upgrades to the optical router with respect to its optical antennas.

The divergence angle/field-of-view of each optical antenna unit is chosen judiciously to maximize antenna gain without jeopardizing availability of an FSO link due to movement of the optical antenna units or mis-alignment. It is noted that larger divergence angles imply an increased stability of the link to antenna movements, and smaller divergence angles imply higher antenna gain (and thus increased effective range).

In prior art FSO transceiver systems, the active electronics and antenna optics are combined in a single enclosure. This transceiver enclosure is typically mounted at some outdoor location (e.g. the roof of a building) so that the antenna optics can achieve a light-of-sight to a communicating system. The transceiver enclosure often includes an active alignment system to correct for the perturbations in antenna alignment due to wind loading and building shift, etc. Thus, an electrical utility connection is often installed at the outdoor location to provide power to the active electronics in the enclosure and the active alignment system. For proper operation under certain conditions, the active electronics may require environmental control (e.g. air conditioning) which adds to the cost and power requirements of the deliverable system.

In contrast, in a fiber-coupled FSO system the optical antenna unit is separated from the active electronics in the optoelectronics module. Thus, the optical antenna unit is much smaller and lighter than prior art transceiver enclosures. This implies that the mounting structures for the optical antenna unit are much smaller and/or less massive than for the prior art transceiver enclosures. For example, the optical antenna unit may be mounted using a single concrete anchor into a parapet, or mounted using various configurations of mounting plates for use on masonry, brick, or clamped to conduit. When required for non-penetrating installs, a small and collapsible tripod built from off-the-shelf materials can also be used. In addition, the optical antenna unit provides a smaller profile to the wind. Thus, the optical antenna unit experiences less alignment drift due to wind loading than prior art transceiver enclosures. Similar observations hold for the antennas at the optical router.

The optical antenna unit is significantly more stable than the prior art transceiver enclosures because of its smaller size and weight. Thus, the optical antenna unit is more likely to operate effectively without active alignment. In one embodiment, the subscriber transceiver units (e.g. binocular transceiver system 700 and monocular transceiver system 950) do not include active alignment systems. In addition, the smaller size and weight of the optical antenna unit means that the installer has an increased range of choices available when locating the optical antenna unit to achieve a line of sight to a communicating device/system.

In a fiber-coupled FSO system, the optical antenna unit may consume a small amount of electrical power to heat its lenses. This electrical power may be provided through the one or more hybrid cables which connect the optoelectronics module to the optical antenna unit. Thus, an electrical utility connection does not need to be installed at the outdoor location of the optical antenna unit. This results in a tremendous savings to the user/subscriber. The optoelectronics module may be situated at some indoor location that already has convenient access to an electrical utility connection.

It is noted that the optical antenna units described herein have an optical path which is directly accessibly. By disconnecting the fiber optic cable (e.g. the hybrid cable) from bulkhead connector on the optical antenna unit, an installer may position his/her eye in front of the bulkhead connector (e.g. adapter 712 or 713) and look through the optical path that runs along the axis of the bulkhead connector. A line-of-sight to the remote optical antenna can be rapidly attained by sighting directly through the optical path while adjusting the optical antenna unit in azimuth and elevation.

A small eye-piece with a reticule placed in the socket of the bulkhead connector transforms the optical antenna unit into a telescope so that fine-alignment of the line-of-sight to the corresponding optical antenna can be made in minutes. A charge coupled device (CCD) camera connected to a hand-held battery powered viewer may also be temporarily placed over the eye-piece to aid in alignment.

In one set of embodiments, the optoelectronics module may be configured for rack or wall mounting (e.g. in an indoor cabinet of a telecommunications closet). Such a configuration may be appealing for the service provider/installer or the LAN extension customer. Furthermore, the optoelectronics module may access power through a panel jack or through an edge connector for a wall-mount transformer. Thus, the installer has the option of placing the optoelectronics module at the first place inside a customer's building where power is readily available, or, home-run the fiber optic cable (e.g. the hybrid cable) all the way to the customer's telecommunications closet where the optoelectronics module is mounted on a rack or shelf.

The fiber-coupled configuration allows the optoelectronics module to be removed from the harsh outdoor environment and situated in a benign indoor environment. While the optical antenna unit is situated outdoors, it contains no active optoelectronics and it constructed of materials that can handle the harsh outdoor environment. Thus, the fiber-coupled FSO system does not need an environment control system of its own. This significantly decreases the cost to the consumer of the deliverable system.

The main components and parameters of the fiber-coupled transceiver systems that form an FSO communication link may be chosen to achieve maximum optical margin within eye-safety limits. A communication link may be established with nearly any infrared (IR) wavelength. However, wavelengths in the visible and ultraviolet regions may also be used.

Additionally, wavelength division multiplexing (WDM) and/or code division multiple access (CDMA) techniques may be incorporated to increase the number of communication channels, and power amplifiers such as erbium doped fiber amplifiers (EDFAs) may be incorporated to obtain additional optical margin. The light source(s) and detector(s) for the system may be fiber-coupled and selected for reliable performance within the operating parameters of the system.

Set-Top Box

The present invention contemplates various embodiments of subscriber transceiver units configured as set-top boxes. The set-top box is configured for coupling to (a) one or more optical antenna units are various described herein through one or more hybrid cables as variously described herein, and (b) one or more data devices such as televisions, video conferencing equipment, computers or computer networks, etc. In one embodiment, the set-top box delivers a digital video signal to a television. The set-top box may also receive movie commands from a user (e.g. a from the user's remote control device) and deliver command messages to the optical router through the one or more optical antenna units. Such as set-top box may be admirably suited for video-on-demand applications.

Microwave Systems

Figure 31:
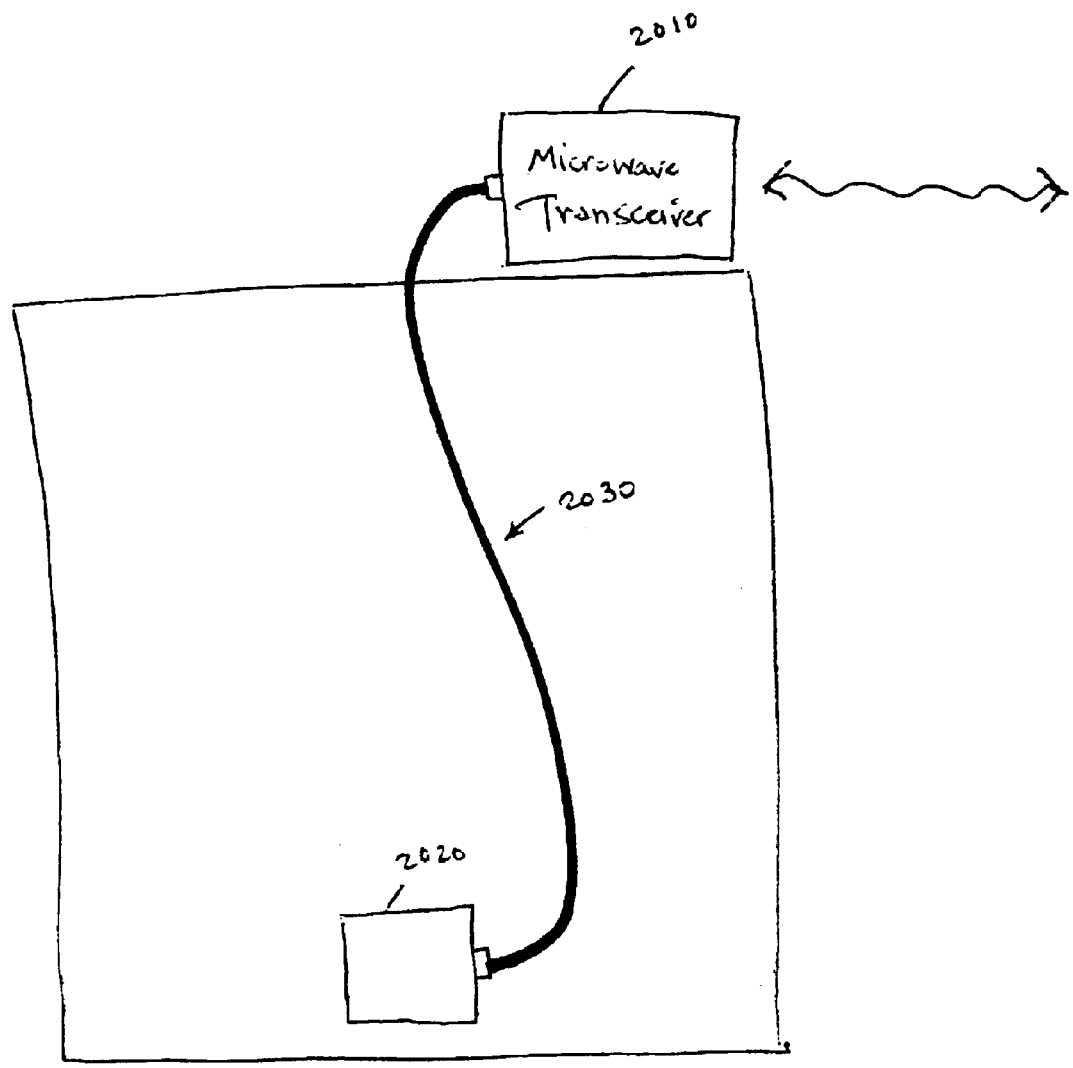
FIG. 31 illustrate one embodiment of a microwave transmission system employing a hybrid cable to separate a microwave transceiver and an indoor unit.

It is noted that many of the inventive principles described herein in connection with free-space optical communication may be translated into the domain of microwave communication. A microwave transceiver 2010 (or transmitter or receiver) may be coupled to an indoor unit 2020 through a hybrid cable 2030 (or through a plurality of hybrid cables) as suggested by FIG. 31. The microwave transceiver 2010 may be situated at some outdoor location such as the roof of a building so that its microwave antenna may communicate with one or more microwave correspondents through the atmosphere (or free-space). Indoor unit 2020 may be situated at some indoor location, e.g., a location that is conveniently close to an existing power outlet. The hybrid cable 2030 includes an optical fiber and an electrical conductor as variously described above.

Indoor unit 2020 sends a first data stream to microwave transceiver 2010 through the optical fiber of hybrid cable 2030. Microwave transceiver 2010 transmits the first data stream to the one or more correspondents through a first microwave beam. In the reverse direction, microwave transceiver 2010 receives a second microwave beam from the atmosphere (or free space) from one or more of the correspondents, demodulates a second data stream from the second microwave beam, and sends the second data stream to the indoor unit 2020 through the optical fiber of hybrid cable 2030.

Indoor unit 2020 may deliver power to the microwave transceiver 2010 through the electrical connection of hybrid cable 2030. Thus, a user may be able to avoid the cost of installing a utility power connection to the outdoor location.

Erbium-Doped Fiber Amplifiers

Various device embodiments, system embodiments, and network embodiments have been described herein. It is noted that erbium-doped fiber amplifiers may be used in fiber optic paths to amplify optical signals where needed or desired.

Positioning and Alignment Control

The electrical conductor of a hybrid cable as described variously above may be used to facilitate any of a variety of functions, operations or services. For example, the electrical conductor may be used to transmit antenna positioning information or alignment control data from an optical antenna unit to the optoelectronics unit.

Conclusion

Although the systems, devices and methods of the present invention have been described in terms of various embodiments, the present invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A communication cable comprising:
   a first optical fiber;
   a first intermediate layer surrounding the first optical fiber, wherein the first intermediate layer includes a first electrical conductor, wherein the first electrical conductor comprises a first collection of metallic strands;
   a first electrically insulating jacket surrounding the first intermediate layer;
   a first metallic ferrule which couples to the first electrical conductor at a first end of the communication cable; and
   a first crimping sleeve configured to slide up over a rear portion of the first metallic ferrule and to crimp the first collection of metallic strands onto said rear portion.

2. The communication cable of claim 1, wherein the first intermediate layer also includes first non-conductive strengthening material.

3. The communication cable of claim 1, wherein the first collection of metallic fibers are braided.

4. The communication cable of claim 1, wherein the first collection of metallic fibers surround the first optical fiber.

5. The communication cable of claim 1 further comprising:
   a second optical fiber;
   a second intermediate layer surrounding the second optical fiber; and
   wherein the first electrically insulating jacket also surrounds the second intermediate layer;
   wherein the second intermediate layer includes a second electrical conductor.

6. The communication cable of claim 5, wherein the first electrically insulating jacket has a zipcord format.

7. The communication cable of claim 1, further comprising a first electrically insulating coupling nut surrounding the first metallic ferrule.

8. A method for terminating an opto-electronic cable with an opto-electronic connector, wherein the opto-electronic cable has an optical fiber, an intermediate layer comprising metallic strands surrounding the optical fiber and an electrically insulating jacket surrounding the metallic strands, the method comprising:

fixing the optical fiber in a fiber cavity within a metallic ferrule;

placing the metallic strands in proximity to a first external end portion of the metallic ferrule; and sliding a metallic crimping sleeve over the metallic strands to crimp the metallic strands onto the first external end portion of the metallic ferrule thereby establishing an electrical contact.

9. The method of claim 8 further comprising sliding a strain relief boot over the metallic crimping sleeve.

10. The method of claim 8 further comprising twisting the metallic strands into a bundle prior to placing the metallic strands in proximity to a first external end portion of the metallic ferrule.

11. A communication system comprising:

a hybrid cable comprising a first optical fiber, a first intermediate layer surrounding the first optical fiber, a first jacket surrounding the first intermediate layer, wherein the first intermediate layer includes a first electrical conductor, wherein the first intermediate layer also includes first non-conductive strengthening material;

a first communication device coupled to the first optical fiber and the first electrical conductor at a first end of the hybrid cable;

a second communication device coupled to first optical fiber and the first electrical conductor at a second end of the hybrid cable.

12. The communication system of claim 11, wherein the first electrical conductor comprises a collection of metallic strands.

13. The communication system of claim 12, wherein the collection of metallic strands are distributed within the first intermediate layer so as to surround the first optical fiber.

14. The communication system of claim 11, wherein the first communication device includes a power source configured to deliver electrical power to the second communication device through the first electrical conductor.

15. The communication system of claim 11, where the first communication device includes a light source which is configured to generate a light beam which is to be modulated and transmitted through the first optical fiber to the second communication device.

16. The communication system of claim 11, wherein the first communication device includes an optical receiver for demodulating data from an optical signal received through the first optical fiber.

17. The communication system of claim 11, wherein the second communication device is an optical antenna unit configured to receive a modulated light beam from the first optical fiber and to transmit the first light beam into the atmosphere.

18. The communication system of claim 11, wherein the second communication device is an optical antenna unit configured to receive a portion of a modulated light beam from the atmosphere and to send said portion to the first communication device through the first optical fiber.

19. The communication system of claim 11, wherein the second communication device is an optical antenna unit, wherein the optical antenna unit includes a resistive heating element which receives electrical power transmitted through the first electrical conductor from the first communication device.

20. The communication system of claim 11, wherein the first communication device includes a light source and a safety control system, wherein the safety control system is configured to detect an open loop condition in an electrical circuit which includes the first electrical conductor, wherein the safety control system is configured to decrease the emitted power of a light source in response to detecting the open loop condition.

21. The communication system of claim 11, wherein the first communication device and second communication device are fiber optic transceivers.

22. The communication system of claim 11, wherein the first communication device is situated at a first location internal to a building, wherein the second communication device is an optical antenna unit situated at a second location external to said building.

23. The communication system of claim 22, wherein the first communication device is configured for coupling to a host computer.

24. The communication system of claim 11, wherein the first communication device is a point-to-point transceiver unit and the second communication device is an optical antenna unit.

25. The communication system of claim 11, wherein the first communication device is a point-to-multipoint optical transceiver unit and the second communication device is an optical antenna unit.

26. The communication system of claim 11, wherein the first communication device is configured for bi-directional transfer of optical signals through the first optical fiber.

27. The communication system of claim 11, wherein hybrid cable includes ST-type terminations.

28. A communication system comprising:

a hybrid cable comprising a first optical fiber, a first intermediate layer surrounding the first optical fiber, a first jacket surrounding the first intermediate layer, wherein the first intermediate layer includes a first electrical conductor;

a first communication device coupled to the first optical fiber and the first electrical conductor at a first end of the hybrid cable; and a second communication device coupled to first optical fiber and the first electrical conductor at a second end of the hybrid cable;

wherein the first communication device includes a light source and a safety control system, wherein the safety control system is configured to detect change in an electrical quantity associated with an electrical circuit which includes the first electrical conductor, wherein the safety control system is configured to decrease the power emitted by a light source in response to detecting the change.

* * * * *